(12) United States Patent
Stanesic et al.

(10) Patent No.: US 10,604,077 B2
(45) Date of Patent: Mar. 31, 2020

(54) MODULAR RAIL AND STEP SYSTEM

(71) Applicant: Lund, Inc., Buford, GA (US)

(72) Inventors: John Matthew Stanesic, Dacula, GA (US); William Franklin Bibb, VI, Buford, GA (US); Brian T. Johnson, Lawrenceville, GA (US); John A. Wargo, Atlanta, GA (US)

(73) Assignee: LUND, INC., Buford, GA (US)

( * ) Notice: Subject to any disclaimer, the term of this patent is extended or adjusted under 35 U.S.C. 154(b) by 0 days.

(21) Appl. No.: 16/536,021

(22) Filed: Aug. 8, 2019

(65) Prior Publication Data

US 2020/0031287 A1    Jan. 30, 2020

Related U.S. Application Data

(63) Continuation of application No. 15/726,171, filed on Oct. 5, 2017, now Pat. No. 10,391,944, which is a
(Continued)

(51) Int. Cl.
*B60R 3/00* (2006.01)
*H04N 19/40* (2014.01)
(Continued)

(52) U.S. Cl.
CPC .............. *B60R 3/007* (2013.01); *B60R 3/002* (2013.01); *G06T 1/20* (2013.01); *G06T 1/60* (2013.01);
(Continued)

(58) Field of Classification Search
CPC ................ B60R 3/00; B60R 3/02; B60R 3/04
See application file for complete search history.

(56) References Cited

U.S. PATENT DOCUMENTS

| 7,591 A | 8/1850 | Burdett |
|---|---|---|
| 752,031 A | 2/1904 | Chadwick |

(Continued)

FOREIGN PATENT DOCUMENTS

| CA | 2 082 177 | 5/1994 |
|---|---|---|
| CA | 2 332 193 | 9/2001 |

(Continued)

OTHER PUBLICATIONS

N-FAB Catalog, 2013 Collection, Version 2.1, front page, pp. 24, 25, 28, 29, back page (2013).
(Continued)

*Primary Examiner* — John D Walters
*Assistant Examiner* — James J Triggs
(74) *Attorney, Agent, or Firm* — Knobbe Martens Olson & Bear LLP

(57) ABSTRACT

A modular side rail and removable step system for a vehicle is disclosed. In one aspect, the kit includes first, second, and third removable steps that may be mounted to the side rail. In one aspect, the side rail main body has a channel-shape defining a longitudinal opening between an adjacent first side and an adjacent second side. A plurality of step attachment arrangements may be provided on the first side of the side rail main body to allow the first, second, and third steps to be mounted to the side rail main body in various configurations. For example the plurality of step attachment arrangements may be arranged and configured to provide attachment locations for mounting the first and third removable steps in a first step assembly configuration and for mounting the second removable step in a second step assembly configuration.

20 Claims, 33 Drawing Sheets

Related U.S. Application Data continuation of application No. 14/875,003, filed on Oct. 5, 2015, now Pat. No. 9,809,172, which is a continuation of application No. 14/039,659, filed on Sep. 27, 2013, now Pat. No. 9,156,406.

(51) Int. Cl.
  *H04N 19/433* (2014.01)
  *H04N 19/91* (2014.01)
  *G06T 1/20* (2006.01)
  *G06T 1/60* (2006.01)
  *H04N 19/436* (2014.01)

(52) U.S. Cl.
  CPC ........... *H04N 19/40* (2014.11); *H04N 19/433* (2014.11); *H04N 19/436* (2014.11); *H04N 19/91* (2014.11); *Y10T 29/49904* (2015.01)

(56) References Cited

U.S. PATENT DOCUMENTS

| | | |
|---|---|---|
| 955,658 A | 4/1910 | Mitchell et al. |
| 1,250,604 A | 12/1917 | Lorenc |
| 1,449,031 A | 3/1923 | Blake |
| 1,471,972 A | 10/1923 | Miller |
| 2,041,640 A | 5/1936 | Goss |
| 2,122,040 A | 6/1938 | Machovec |
| 2,125,085 A | 7/1938 | Pool |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,669,613 A | 2/1954 | Despard |
| 2,678,832 A | 5/1954 | Wright |
| 2,764,422 A | 9/1956 | McDonald |
| 2,925,876 A | 2/1960 | Wagner |
| 3,039,562 A | 6/1962 | Wagner |
| 3,095,216 A | 6/1963 | Browne |
| 3,172,499 A | 3/1965 | Stairs |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,671,058 A | 6/1972 | Kent |
| 3,762,742 A | 10/1973 | Bucklen |
| 3,807,757 A | 4/1974 | Carpenter et al. |
| 3,833,240 A | 9/1974 | Weiler |
| 3,865,399 A | 2/1975 | Way |
| 3,887,217 A | 6/1975 | Thomas |
| 3,889,997 A | 6/1975 | Schoneck |
| 3,891,261 A | 6/1975 | Finneman |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 4,020,920 A | 5/1977 | Abbott |
| 4,068,542 A | 1/1978 | Brand et al. |
| 4,073,502 A | 2/1978 | Frank et al. |
| 4,089,538 A | 5/1978 | Eastridge |
| 4,106,790 A | 8/1978 | Weiler |
| 4,110,673 A | 8/1978 | Nagy et al. |
| 4,116,457 A | 9/1978 | Nerem et al. |
| 4,164,292 A | 8/1979 | Karkau |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,231,583 A | 11/1980 | Learn |
| 4,312,515 A | 1/1982 | Allori |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,679,810 A | 7/1987 | Kimball |
| D292,904 S | 11/1987 | Bielby |
| 4,720,116 A | 1/1988 | Williams et al. |
| 4,733,752 A | 3/1988 | Sklar |
| 4,909,700 A | 3/1990 | Fontecchio et al. |
| 4,982,974 A | 1/1991 | Guidry |
| 5,005,667 A | 4/1991 | Anderson |
| 5,005,850 A | 4/1991 | Baughman |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| D340,905 S | 11/1993 | Orth et al. |
| 5,257,847 A | 11/1993 | Yonehara |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,584,493 A | 12/1996 | Demski et al. |
| 5,601,300 A | 2/1997 | Fink et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,897,125 A | 4/1999 | Bundy |
| 5,941,342 A | 8/1999 | Lee |
| 5,957,237 A | 9/1999 | Tigner |
| 6,042,052 A | 3/2000 | Smith et al. |
| 6,055,780 A | 5/2000 | Yamazaki |
| 6,082,751 A | 7/2000 | Hanes et al. |
| 6,112,152 A | 8/2000 | Tuttle |
| 6,149,172 A | 11/2000 | Pascoe et al. |
| 6,168,176 B1 | 1/2001 | Mueller |
| 6,179,312 B1 | 1/2001 | Paschke et al. |
| 6,203,040 B1 | 3/2001 | Hutchins |
| 6,213,486 B1 | 4/2001 | Kunz et al. |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,511,086 B2 | 1/2003 | Schlicht |
| 6,513,821 B1 | 2/2003 | Heil |
| 6,533,303 B1 | 3/2003 | Watson |
| 6,588,783 B2 | 7/2003 | Fichter |

(56) References Cited

U.S. PATENT DOCUMENTS

| | | | |
|---|---|---|---|
| 6,641,158 B2 | 11/2003 | Leitner | |
| 6,659,484 B2 | 12/2003 | Knodle et al. | |
| 6,663,125 B1 | 12/2003 | Cheng | |
| 6,746,033 B1 | 6/2004 | McDaniel | |
| 6,769,704 B2 | 8/2004 | Cipolla | |
| 6,810,995 B2 | 11/2004 | Warford | |
| 6,812,466 B2 | 11/2004 | O'Connor et al. | |
| 6,830,257 B2 | 12/2004 | Leitner | |
| 6,834,875 B2 | 12/2004 | Leitner | |
| 6,840,526 B2 | 1/2005 | Anderson et al. | |
| 6,874,801 B2 | 4/2005 | Fichter | |
| 6,880,843 B1 | 4/2005 | Greer, Jr. | |
| 6,912,912 B2 | 7/2005 | Reichinger et al. | |
| 6,918,624 B2 | 7/2005 | Miller et al. | |
| 6,926,295 B2 | 8/2005 | Berkebile et al. | |
| 6,938,909 B2 | 9/2005 | Leitner | |
| 6,942,233 B2 | 9/2005 | Leitner et al. | |
| 6,942,272 B2 | 9/2005 | Livingston | |
| 6,948,903 B2 | 9/2005 | Ablabutyan et al. | |
| 6,951,357 B2 | 10/2005 | Armstrong et al. | |
| 6,955,370 B2 | 10/2005 | Fabiano et al. | |
| 6,959,937 B2 | 11/2005 | Schneider et al. | |
| 6,966,597 B2 | 11/2005 | Tegtmeier | |
| 6,971,652 B2 | 12/2005 | Bobbert et al. | |
| 6,997,469 B2 | 2/2006 | Lanoue et al. | |
| 7,000,932 B2 | 2/2006 | Heil et al. | |
| 7,007,961 B2 | 3/2006 | Leitner | |
| 7,017,927 B2 | 3/2006 | Henderson et al. | |
| 7,055,839 B2 | 6/2006 | Leitner | |
| 7,070,194 B2 | 7/2006 | Garland et al. | |
| 7,090,276 B1 | 8/2006 | Bruford et al. | |
| 7,111,858 B2 | 9/2006 | Manser et al. | |
| 7,111,859 B2 | 9/2006 | Kim et al. | |
| 7,118,120 B2 | 10/2006 | Lee et al. | |
| 7,118,150 B2 | 10/2006 | Bruford et al. | |
| 7,163,221 B2 | 1/2007 | Leitner | |
| 7,185,904 B1 | 3/2007 | Jones | |
| 7,219,911 B2 | 5/2007 | Sukonthapanich et al. | |
| 7,258,386 B2 | 8/2007 | Leitner | |
| 7,287,770 B2 | 10/2007 | Drabant et al. | |
| 7,287,771 B2 | 10/2007 | Lee et al. | |
| 7,311,320 B2 | 12/2007 | Kuntze et al. | |
| 7,318,596 B2 | 1/2008 | Scheuring, III et al. | |
| 7,360,779 B2 | 4/2008 | Crandall | |
| 7,367,574 B2 | 5/2008 | Leitner | |
| 7,377,531 B2 | 5/2008 | Fabiano et al. | |
| 7,380,807 B2 | 6/2008 | Leitner | |
| 7,398,985 B2 | 7/2008 | Leitner et al. | |
| 7,413,204 B2 | 8/2008 | Leitner | |
| 7,413,205 B2 | 8/2008 | Watson | |
| 7,413,233 B1 | 8/2008 | Jung | |
| 7,416,202 B2 | 8/2008 | Fichter | |
| 7,434,825 B2 | 10/2008 | Williams | |
| 7,438,305 B2 | 10/2008 | Schulz | |
| 7,441,790 B2 | 10/2008 | Lechkun | |
| 7,445,221 B2 | 11/2008 | Kobayashi | |
| 7,469,916 B2 | 12/2008 | Watson | |
| 7,487,986 B2 | 2/2009 | Leither et al. | |
| 7,513,520 B2 | 4/2009 | Okuyama | |
| 7,513,565 B2 | 4/2009 | Watson | |
| 7,516,703 B2 | 4/2009 | Tazreiter | |
| 7,530,619 B1 | 5/2009 | Bruford et al. | |
| 7,566,064 B2 | 7/2009 | Leitner et al. | |
| 7,584,975 B2 | 9/2009 | Leitner | |
| 7,585,033 B2 | 9/2009 | Holt | |
| 7,594,672 B2 | 9/2009 | Piotrowski | |
| 7,621,546 B2 | 11/2009 | Ross et al. | |
| 7,635,247 B2 | 12/2009 | Collins | |
| 7,637,519 B2 | 12/2009 | Leitner et al. | |
| 7,673,892 B2 | 3/2010 | Kuntze et al. | |
| 7,703,784 B2 | 4/2010 | Plavetich | |
| 7,712,755 B2 | 5/2010 | Yang et al. | |
| 7,717,444 B2 | 5/2010 | Fichter | |
| D618,148 S | 6/2010 | Hoppert | |
| 7,731,212 B2 | 6/2010 | Storer | |
| 7,740,260 B2 | 6/2010 | VanBelle et al. | |
| 7,740,261 B2 | 6/2010 | Leitner et al. | |
| 7,766,357 B2 | 8/2010 | Arvanites | |
| 7,775,536 B2 | 8/2010 | Shumway | |
| 7,793,596 B2 | 9/2010 | Hirtenlehner | |
| 7,823,896 B2 | 11/2010 | VanBelle | |
| 7,874,565 B2* | 1/2011 | Duncan | B60R 3/002 |
| | | | 280/163 |
| D634,687 S | 3/2011 | Vukel | |
| 7,900,944 B2 | 3/2011 | Watson | |
| 7,909,344 B1* | 3/2011 | Bundy | B60R 3/02 |
| | | | 280/163 |
| 7,934,737 B2 | 5/2011 | Okada | |
| 7,976,042 B2 | 7/2011 | Watson et al. | |
| 8,038,164 B2 | 10/2011 | Stahl et al. | |
| 8,042,821 B2 | 10/2011 | Yang | |
| D649,100 S | 11/2011 | Cheng | |
| 8,052,162 B2 | 11/2011 | Yang et al. | |
| 8,056,913 B2 | 11/2011 | Kuntze et al. | |
| 8,070,173 B2 | 12/2011 | Watson | |
| 8,136,826 B2 | 3/2012 | Watson | |
| 8,157,277 B2 | 4/2012 | Leitner et al. | |
| 8,177,247 B1 | 5/2012 | Carr | |
| 8,205,901 B2 | 6/2012 | Yang et al. | |
| D665,713 S | 8/2012 | Pochurek et al. | |
| 8,262,113 B1 | 9/2012 | Chafey et al. | |
| 8,297,635 B2 | 10/2012 | Agoncillo et al. | |
| D671,874 S | 12/2012 | Kekich et al. | |
| 8,342,550 B2 | 1/2013 | Stickles et al. | |
| 8,342,551 B2 | 1/2013 | Watson et al. | |
| 8,360,455 B2 | 1/2013 | Leitner et al. | |
| D676,368 S | 2/2013 | Cover | |
| 8,366,129 B2 | 2/2013 | Salmon | |
| 8,382,132 B2 | 2/2013 | Kowalski | |
| 8,408,571 B2 | 4/2013 | Leitner et al. | |
| 8,419,034 B2 | 4/2013 | Leitner et al. | |
| 8,448,967 B2 | 5/2013 | Storer | |
| 8,448,968 B1 | 5/2013 | Grote et al. | |
| 8,463,953 B2 | 6/2013 | Davis et al. | |
| 8,469,380 B2 | 6/2013 | Yang et al. | |
| 8,602,431 B1 | 12/2013 | May | |
| 8,641,068 B1 | 2/2014 | Bundy | |
| 8,662,512 B2 | 3/2014 | May | |
| 8,668,217 B2 | 3/2014 | Ziaylek | |
| 8,696,005 B2 | 4/2014 | Kim | |
| 8,827,293 B1 | 9/2014 | Bundy | |
| 8,827,294 B1 | 9/2014 | Leitner et al. | |
| 8,833,782 B2 | 9/2014 | Huotari | |
| 8,844,957 B2 | 9/2014 | Leitner et al. | |
| D720,674 S | 1/2015 | Stanesic et al. | |
| 8,936,266 B2 | 1/2015 | Leitner et al. | |
| 8,944,451 B2 | 2/2015 | Leitner et al. | |
| 8,985,606 B2 | 3/2015 | Fichter | |
| 9,156,406 B2 | 10/2015 | Stanesic et al. | |
| 9,272,667 B2 | 3/2016 | Smith | |
| 9,302,626 B2 | 4/2016 | Leitner et al. | |
| 9,308,870 B2 | 4/2016 | Yang | |
| 9,346,404 B1* | 5/2016 | Bundy | B60R 3/00 |
| 9,346,405 B2 | 5/2016 | Leitner et al. | |
| 9,434,317 B2 | 9/2016 | Nania | |
| 9,452,713 B2 | 9/2016 | Stickles | |
| 9,511,717 B2 | 12/2016 | Smith | |
| 9,522,634 B1 | 12/2016 | Smith | |
| 9,527,449 B2 | 12/2016 | Smith | |
| 9,550,458 B2 | 1/2017 | Smith et al. | |
| 9,561,751 B2 | 2/2017 | Leitner et al. | |
| 9,656,609 B2 | 5/2017 | Du et al. | |
| 9,669,766 B2 | 6/2017 | Du et al. | |
| 9,669,767 B2 | 6/2017 | Du et al. | |
| 9,688,205 B2 | 6/2017 | Du et al. | |
| 9,701,249 B2 | 7/2017 | Leitner et al. | |
| 9,809,172 B2* | 11/2017 | Stanesic | H04N 19/40 |
| 9,834,147 B2 | 12/2017 | Smith | |
| 9,902,328 B1 | 2/2018 | Mazur | |
| 9,944,231 B2 | 4/2018 | Leitner et al. | |
| 10,053,017 B2 | 8/2018 | Leitner et al. | |
| 10,065,486 B2 | 9/2018 | Smith et al. | |
| 10,077,016 B2 | 9/2018 | Smith et al. | |
| 10,081,302 B1 | 9/2018 | Frederick et al. | |

(56) References Cited

U.S. PATENT DOCUMENTS

| | | |
|---|---|---|
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,839 B2 | 11/2018 | Povinelli et al. |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Krishnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,246,019 B1 | 4/2019 | Carr |
| 10,246,137 B2 | 4/2019 | Ngo |
| 10,272,841 B1 | 4/2019 | Wymore |
| 10,272,842 B2 | 4/2019 | Du et al. |
| 10,322,677 B1 | 6/2019 | Leitner et al. |
| 10,336,260 B1 | 7/2019 | Salter et al. |
| 10,336,378 B2 | 7/2019 | Marchlewski et al. |
| 10,343,610 B2 | 7/2019 | Long et al. |
| 10,351,182 B2 | 7/2019 | Zielinski et al. |
| 10,391,944 B2 | 8/2019 | Stanesic et al. |
| 2002/0109446 A1 | 8/2002 | Arnold |
| 2002/0130531 A1 | 9/2002 | Leitner |
| 2003/0090081 A1 | 5/2003 | Oakley |
| 2003/0094781 A1 | 5/2003 | Jaramillo et al. |
| 2003/0200700 A1 | 10/2003 | Leitner |
| 2004/0207224 A1 | 10/2004 | Miller et al. |
| 2005/0117969 A1 | 6/2005 | Byrne |
| 2005/0146157 A1 | 7/2005 | Leitner |
| 2005/0263974 A1 | 12/2005 | Mulder |
| 2006/0208449 A1 | 9/2006 | Kuo et al. |
| 2008/0034552 A1 | 2/2008 | Nguyen |
| 2008/0084045 A1 | 4/2008 | Filias et al. |
| 2008/0224438 A1 | 9/2008 | Okada |
| 2009/0072507 A1 | 3/2009 | Storer |
| 2009/0203247 A1 | 8/2009 | Fifelski et al. |
| 2009/0308688 A1 | 12/2009 | Tayar |
| 2010/0176607 A1 | 7/2010 | Hardy et al. |
| 2010/0194070 A1 | 8/2010 | Stauffer et al. |
| 2012/0025485 A1 | 2/2012 | Yang et al. |
| 2012/0228848 A1 | 9/2012 | Fichter |
| 2013/0221632 A1 | 8/2013 | Higgs et al. |
| 2015/0321612 A1 | 11/2015 | Leitner et al. |
| 2015/0321613 A1 | 11/2015 | Leitner et al. |
| 2016/0039346 A1 | 2/2016 | Yang |
| 2016/0288718 A1 | 10/2016 | Hayes et al. |
| 2017/0008459 A1 | 1/2017 | Leitner et al. |
| 2017/0036607 A1 | 2/2017 | Du et al. |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0257572 A1 | 9/2018 | Du et al. |
| 2018/0281687 A1 | 10/2018 | Derbis et al. |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0118720 A1 | 4/2019 | Otacioglu et al. |
| 2019/0118750 A1 | 4/2019 | Bosco |
| 2019/0126832 A1 | 5/2019 | Knichel |
| 2019/0126835 A1 | 5/2019 | Leitner |
| 2019/0126870 A1 | 5/2019 | Rife et al. |
| 2019/0152542 A1 | 5/2019 | Povinelli et al. |
| 2019/0176709 A1 | 6/2019 | Leitner |
| 2019/0193639 A1 | 6/2019 | Smith |

FOREIGN PATENT DOCUMENTS

| | | |
|---|---|---|
| CN | 2174368 Y | 8/1994 |
| CN | 201280106 Y | 7/2009 |
| CN | 100545005 C | 9/2009 |
| CN | 202758405 U | 2/2013 |
| CN | 202847566 U | 4/2013 |
| CN | 103149915 A | 6/2013 |
| CN | 108791086 | 11/2018 |
| CN | 208232903 U | 12/2018 |
| CN | 208325054 U | 1/2019 |
| CN | 208344082 U | 1/2019 |
| CN | 109318812 | 2/2019 |
| CN | 109318813 | 2/2019 |
| CN | 109383384 | 2/2019 |
| CN | 109383386 | 2/2019 |
| CN | 109383388 | 2/2019 |
| CN | 109383390 | 2/2019 |
| CN | 109383392 | 2/2019 |
| CN | 208452901 | 2/2019 |
| CN | 208559193 | 3/2019 |
| CN | 208731206 | 4/2019 |
| CN | 109795418 | 5/2019 |
| CN | 208896972 | 5/2019 |
| DE | 31 51 621 | 7/1983 |
| DE | 39 32 142 | 4/1990 |
| DE | 89 10 933 U1 | 10/1990 |
| EP | 0 066 493 | 12/1982 |
| EP | 1 116 840 | 7/2001 |
| EP | 3 002 157 | 4/2016 |
| EP | 3 176 038 | 1/2019 |
| EP | 3 237 254 | 2/2019 |
| EP | 3 461 713 | 4/2019 |
| FR | 1 350 593 A | 12/1963 |
| FR | 2 225 612 A | 8/1974 |
| GB | 934387 | 8/1963 |
| GB | 936846 | 9/1963 |
| GB | 2 045 699 | 11/1980 |
| GB | 2 129 378 | 5/1984 |
| GB | 2 201 511 | 9/1988 |
| GB | 2 288 014 | 10/1994 |
| IN | 201741011829 | 10/2018 |
| IN | 201737025141 | 3/2019 |
| IN | 201741038321 | 5/2019 |
| JP | 63-255144 | 10/1988 |
| JP | 04-339040 | 11/1992 |
| JP | 04-342629 A1 | 11/1992 |
| JP | 05-310061 | 11/1993 |
| JP | 05-310081 | 11/1993 |
| JP | 8-132967 | 5/1996 |
| JP | 2018-177089 A | 11/2018 |
| JP | 2019-001222 | 1/2019 |
| JP | 6509607 | 4/2019 |
| JP | 2019-069634 | 5/2019 |
| MX | 2017001699 | 6/2018 |
| MX | 2017001700 | 6/2018 |
| MX | 2017006328 | 6/2018 |
| MX | 2017008032 | 9/2018 |
| MX | 2017010183 | 9/2018 |
| MX | 2018000509 | 11/2018 |
| SU | 403594 | 11/1972 |
| TW | M296187 | 8/2006 |
| TW | M318551 | 9/2007 |
| WO | WO 2001/000441 | 1/2001 |
| WO | WO 2003/039910 | 5/2003 |
| WO | WO 2003/039920 | 5/2003 |
| WO | WO 2003/066380 | 8/2003 |
| WO | WO 2003/069294 | 8/2003 |
| WO | WO 2006/050297 | 5/2006 |
| WO | WO 2009/103163 | 8/2009 |
| WO | WO 2017/020527 | 2/2017 |
| WO | WO 2017/140081 | 8/2017 |
| WO | WO 2017/176226 | 10/2017 |
| WO | WO 2018/148643 | 8/2018 |
| WO | WO 2018/197393 | 11/2018 |
| WO | WO 2019/009131 | 1/2019 |
| WO | WO 2019/034493 | 2/2019 |

(56) References Cited

FOREIGN PATENT DOCUMENTS

OTHER PUBLICATIONS

Rampage Products Catalog, front page, pp. 21 and back page (2013).

* cited by examiner

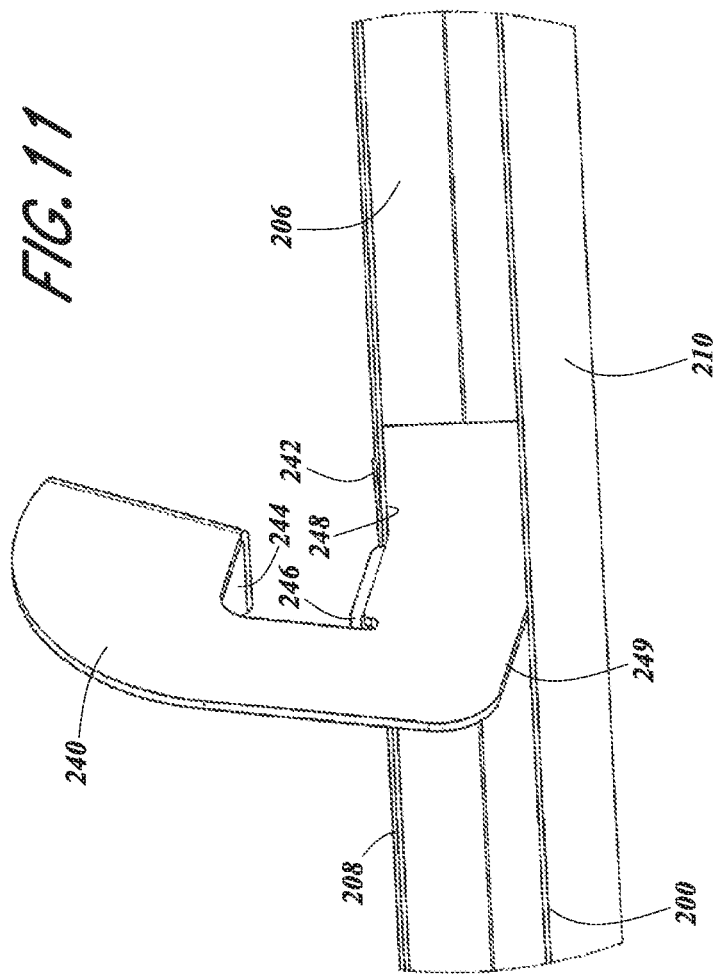

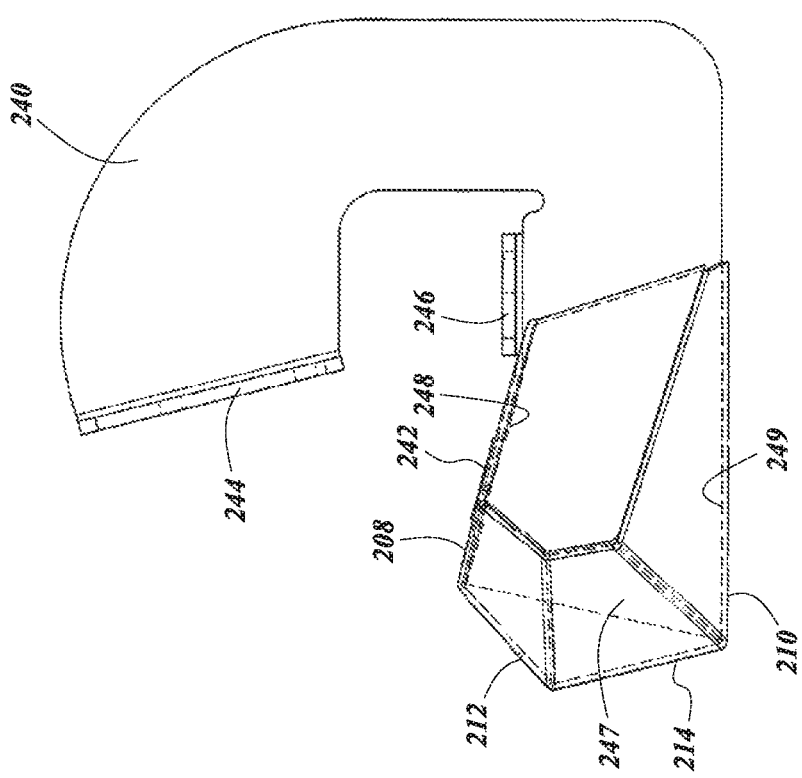

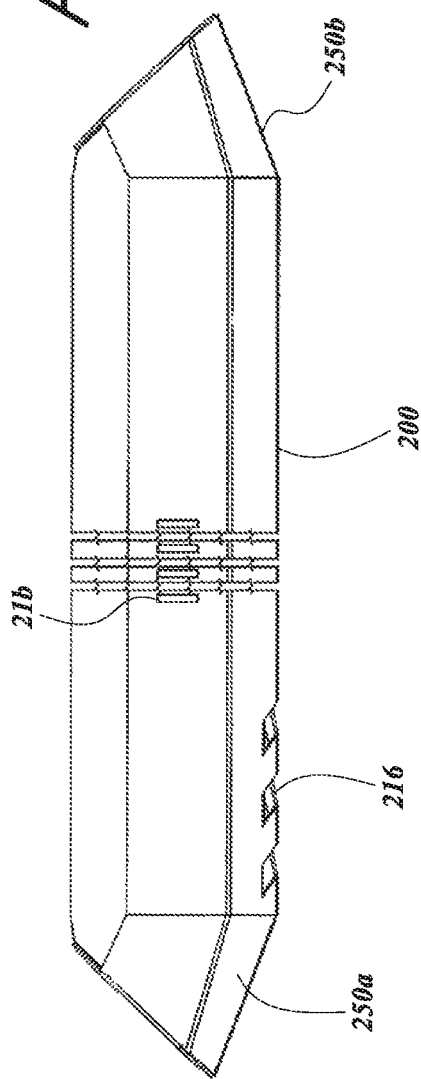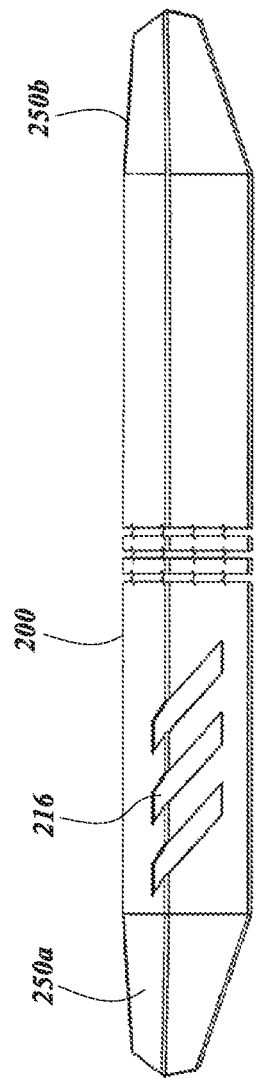

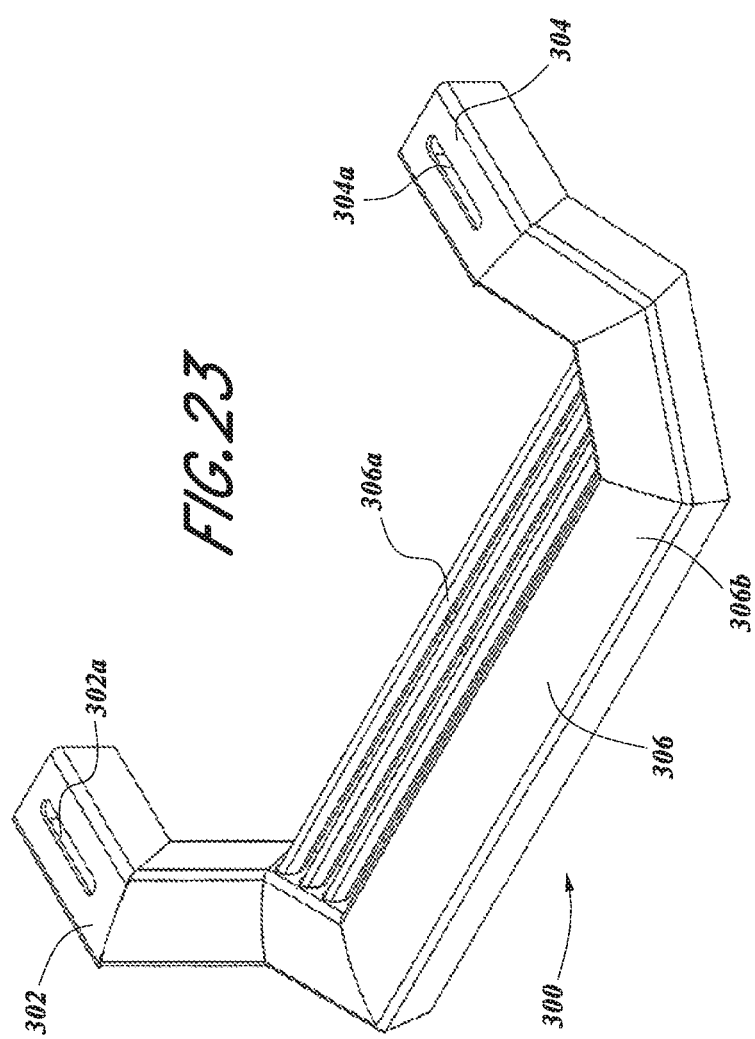

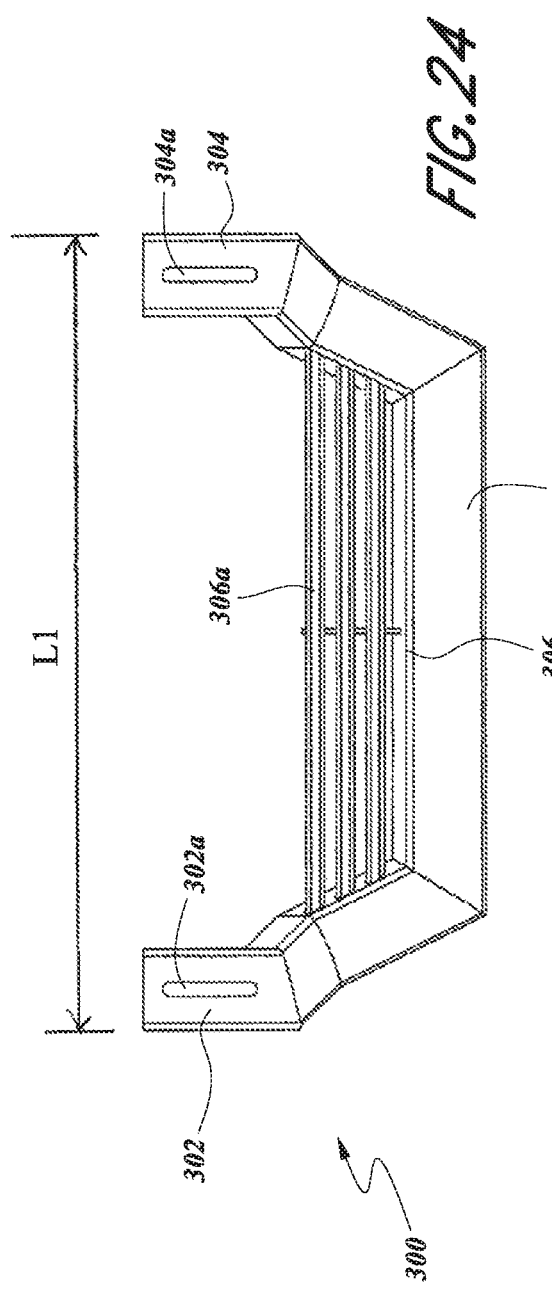
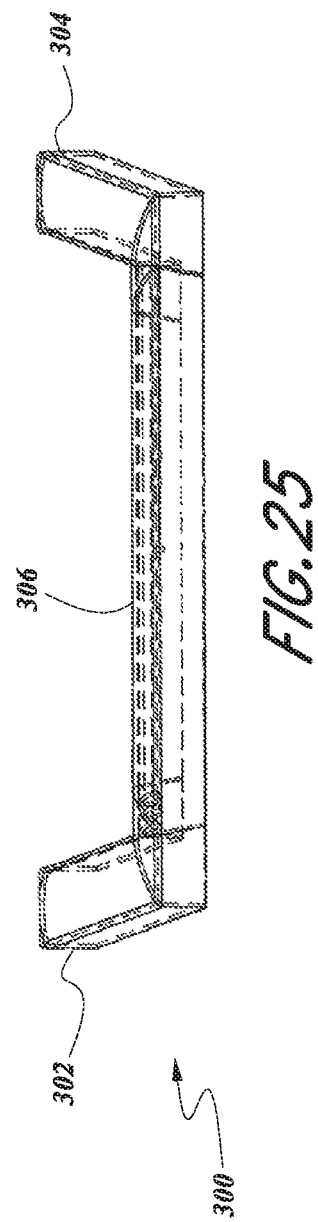

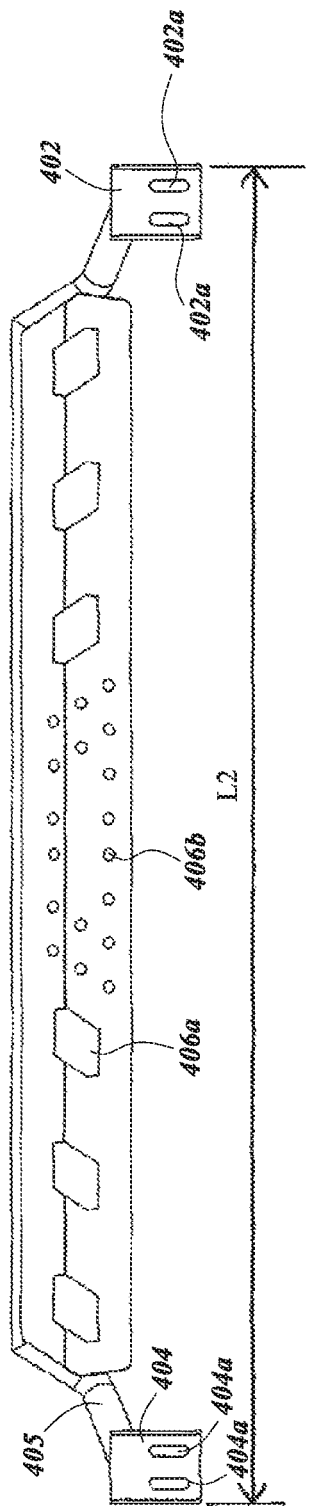
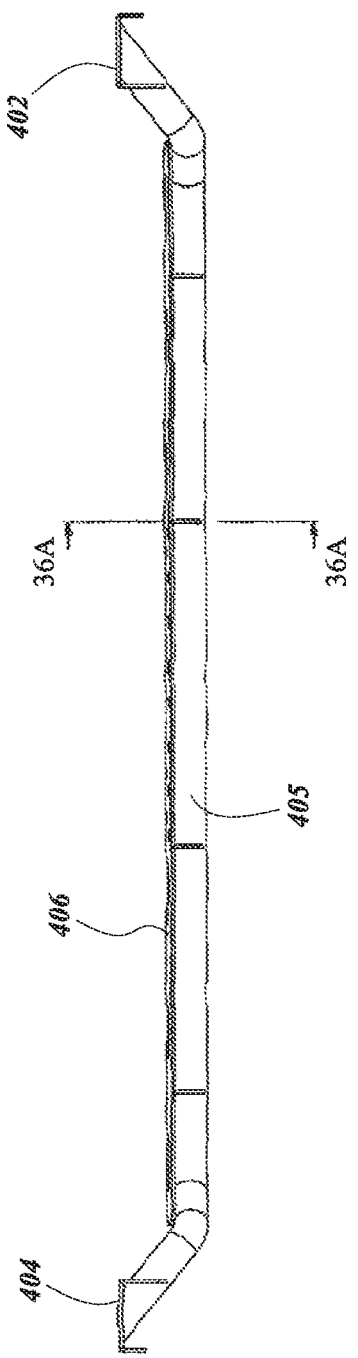

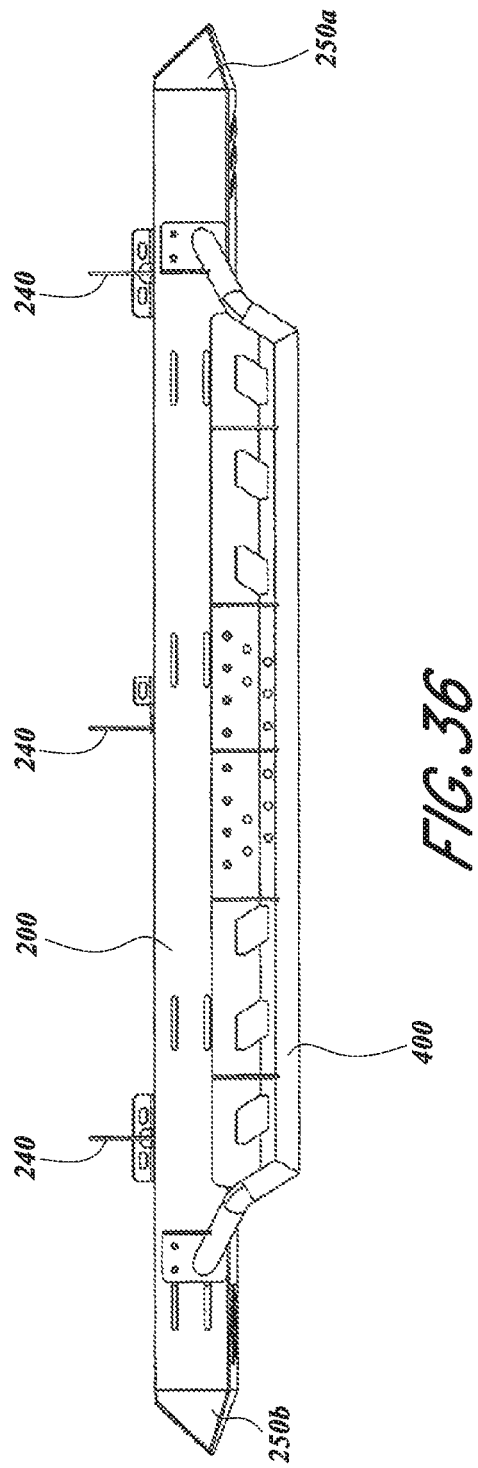

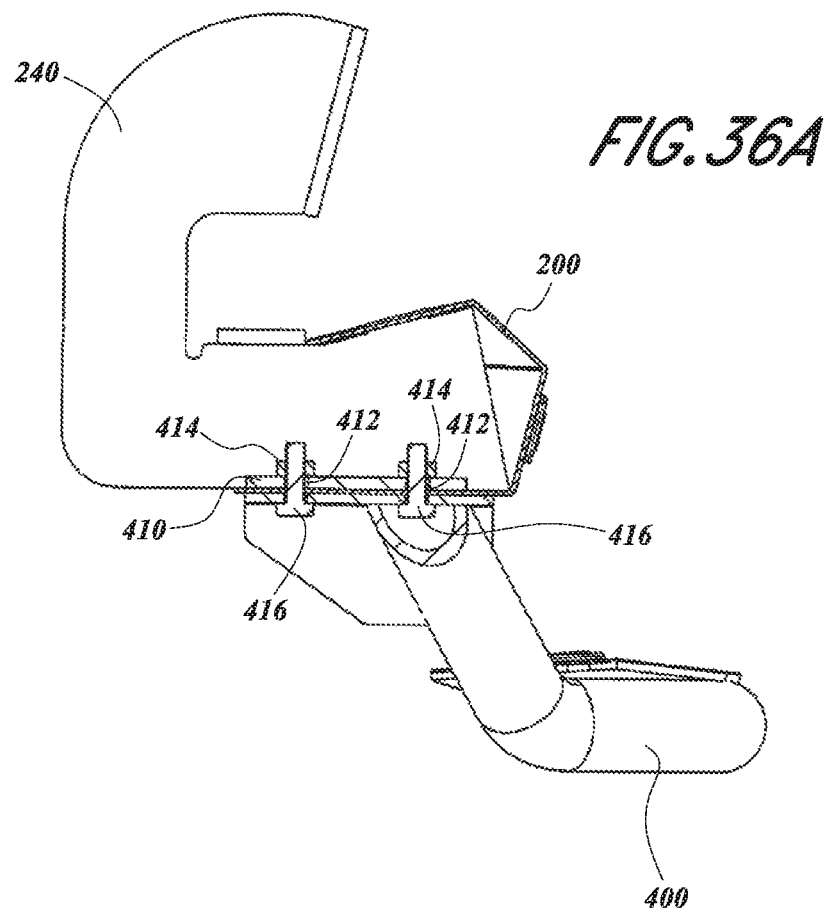

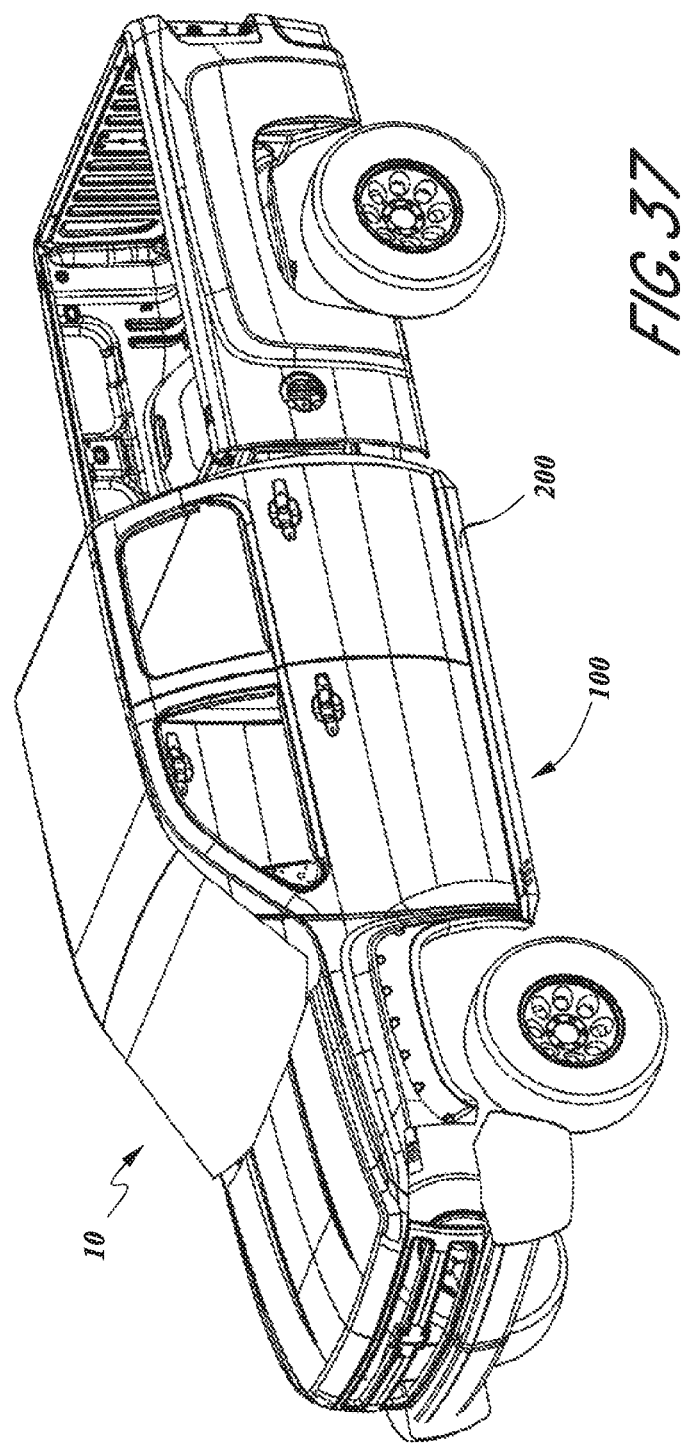

MODULAR RAIL AND STEP SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

This disclosure relates to a modular side rail and step system for a motor vehicle, a motor vehicle including a modular side rail and step system, and a method for installing a modular side rail to a motor vehicle.

BACKGROUND

Many types of vehicles, including sport utility vehicles (e.g. JEEP® brand vehicles), pickup trucks, and vans, are raised off the ground farther than normal passenger automobiles. The increased height of the floor of the passenger cab from the ground makes it difficult to enter and exit these vehicles. In addition, if the vehicles are driven over rough terrain, their lower body panels and door panels are susceptible to being scratched, dented, or otherwise damaged by rocks or other ground debris. To address these issues, side rails can be mounted to the vehicle to provide a stepping surface to assist the driver and passengers in entering and exiting these vehicles. In addition, side rails can function to protect the body of the vehicles from being damaged from below. As different types and models of vehicles can have different numbers and locations of doors, it is often necessary to manufacture a number of different side rails and steps that will properly fit each specific type of vehicle. Improvements are desired.

SUMMARY

A modular side rail and removable step system for a vehicle is disclosed. In one aspect, the kit includes a first removable step having a first length and a second removable step having a second length greater than the first length. The kit may also include a third removable step having a third length that is about equal to the first length. In another aspect, the kit includes a side rail main body extending between a first end and a second end wherein the side rail main body has a channel-shape defining a longitudinal opening between an adjacent first side rail member and an adjacent second side rail member. A plurality of spaced mounting brackets can also be provided that are configured for mounting the side rail main body to the vehicle. In one embodiment, each of the plurality of mounting brackets extend through the main body longitudinal opening and are secured to the main body, for example by welding. A plurality of step attachment arrangements may also be provided on the second side rail member of the side rail main body that are offset from the locations of the plurality of mounting brackets. The plurality of step attachment arrangements may also be arranged and configured to provide attachment locations for mounting the first and third removable steps in a first step assembly configuration and for mounting the second removable step in a second step assembly configuration. In one embodiment, at least one of the plurality of step attachment arrangements is configured to provide an attachment location for both the first step and the second steps.

The above described modular side rail and removable step system can be installed on a vehicle having a first door by mounting the side rail to the vehicle below the first door via the mounting brackets. The first and/or second removable steps can be mounted to the side rail main body either before or after the side rail is mounted to the vehicle. If a different step configuration is desired, the first and/or second removable steps can be removed from the side rail main body and replaced with a third removable step. It is noted that the steps can installed and removed in any order to change from one configuration to any other desired configuration.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 11 is a perspective rear view of a portion of the modular side rail and brackets of FIG. 9.

FIG. 12 is an end view of the modular side rail and brackets of FIG. 9.

FIG. 13 is a top view of the modular side rail of the system shown in FIG. 1.

FIG. 14 is a side view of the modular side rail of FIG. 13.

FIG. 23 is a perspective view of one of the step assemblies of the system shown in FIG. 1.

FIG. 24 is a top view of the step assembly of the system shown in FIG. 23.

FIG. 25 is a side view of the step assembly of the system shown in FIG. 23.

FIG. 34 is a top view of the step assembly of the system shown in FIG. 27.

FIG. 35 is a side view of the step assembly of the system shown in FIG. 34.

FIG. 36 is a bottom view of the step assembly of the system shown in FIG. 34.

FIG. 36A is a cross-sectional view of the modular side rail and step system in the second step assembly configuration of FIG. 34, taken at a location where a step attaches to the side rail.

FIG. 37 is a perspective view of the motor vehicle provided with the modular side rail and step system of FIGS. 1 and 27, but without any of the step assemblies installed.

DETAILED DESCRIPTION

Figure 1:
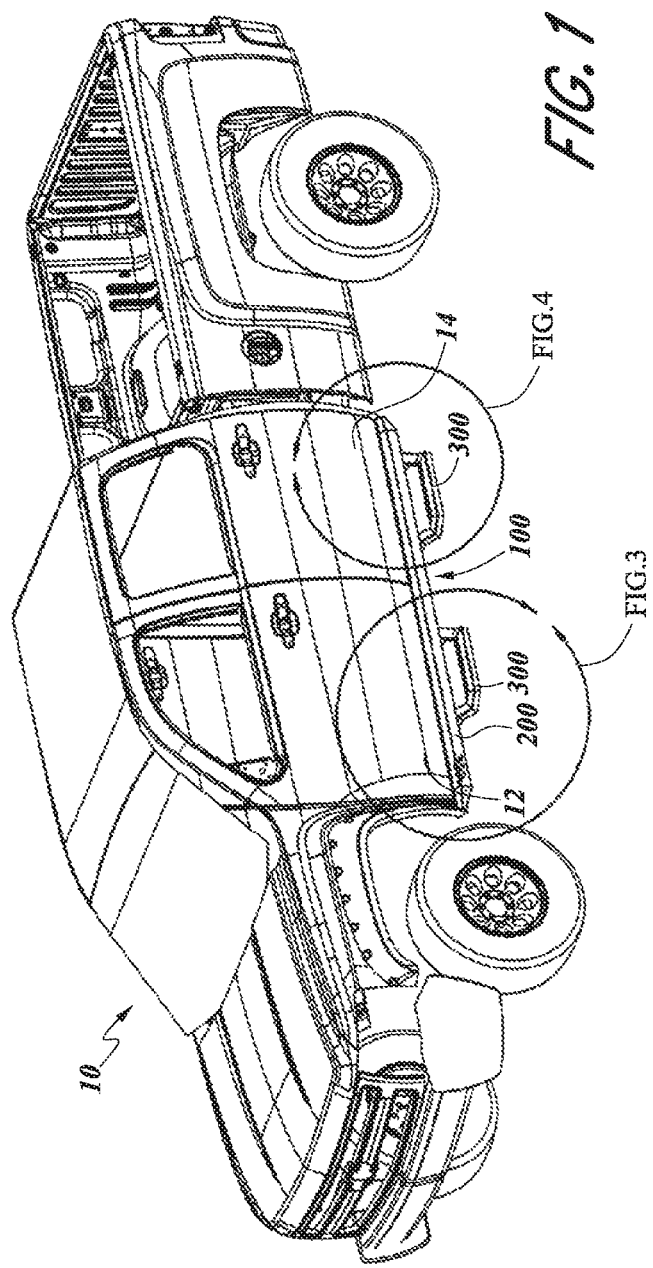
FIG. 1 is a perspective view of a motor vehicle provided with a modular side rail and step system in a first step assembly configuration having features that are examples of aspects in accordance with the principles of the present disclosure.
Figure 2:
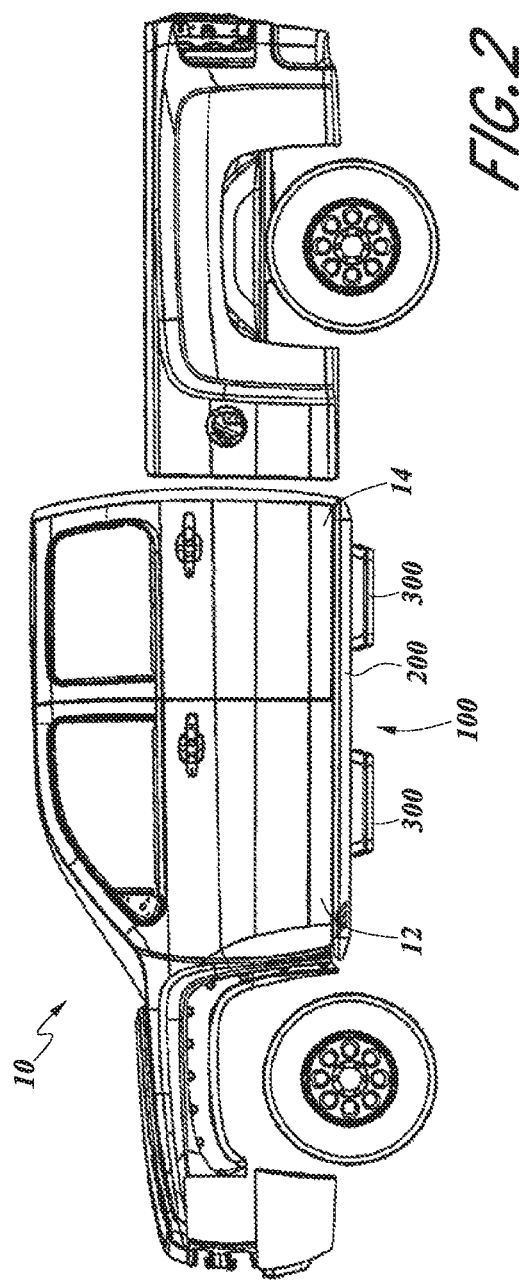
FIG. 2 is a side view of the motor vehicle provided with the modular side rail and step system in the first step assembly configuration of FIG. 1.
Figure 3:
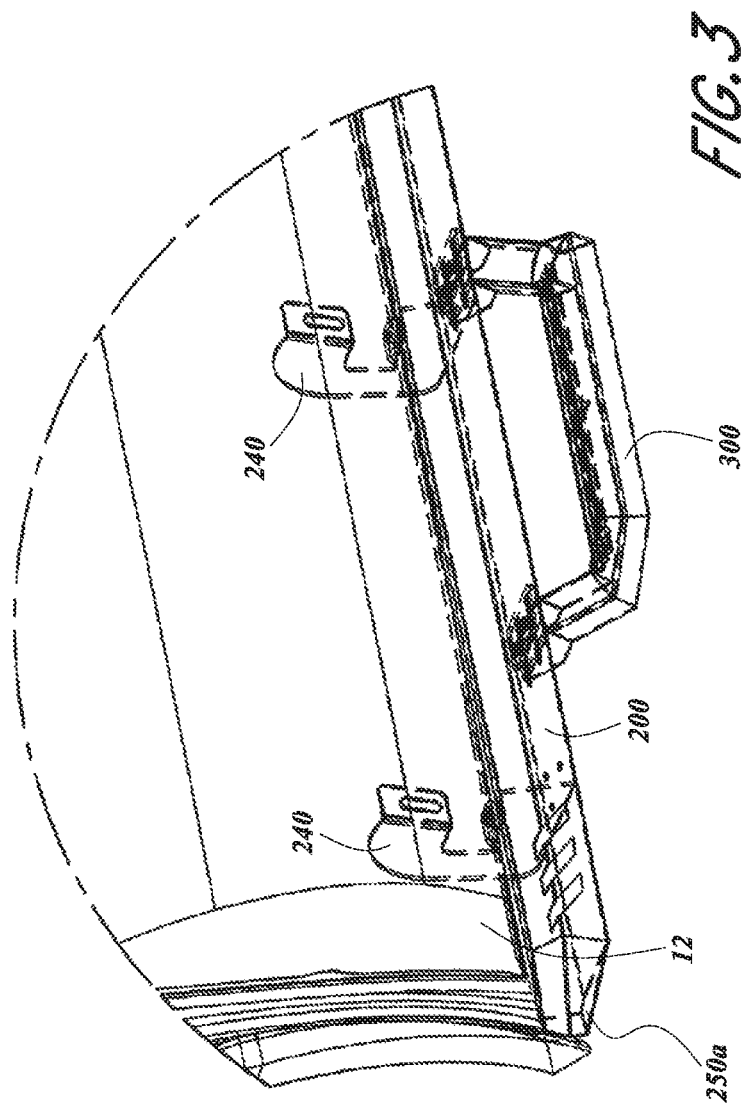
FIG. 3 is an enlarged perspective view of a portion of the vehicle provided with the modular side rail and step system in the first step assembly configuration of FIG. 1, as identified at A1 in FIG. 1.
Figure 4:
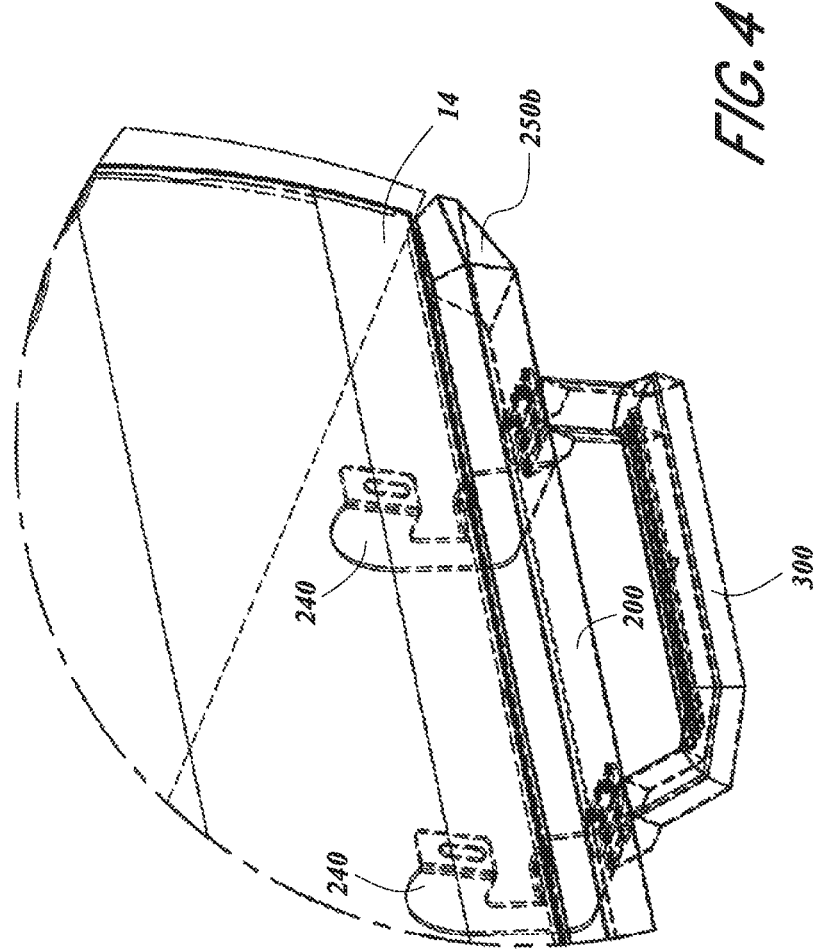
FIG. 4 is an enlarged perspective view of a portion of the vehicle provided with the modular side rail and step system in the first step assembly configuration of FIG. 1, as identified at A2 in FIG. 1.
Figure 5:
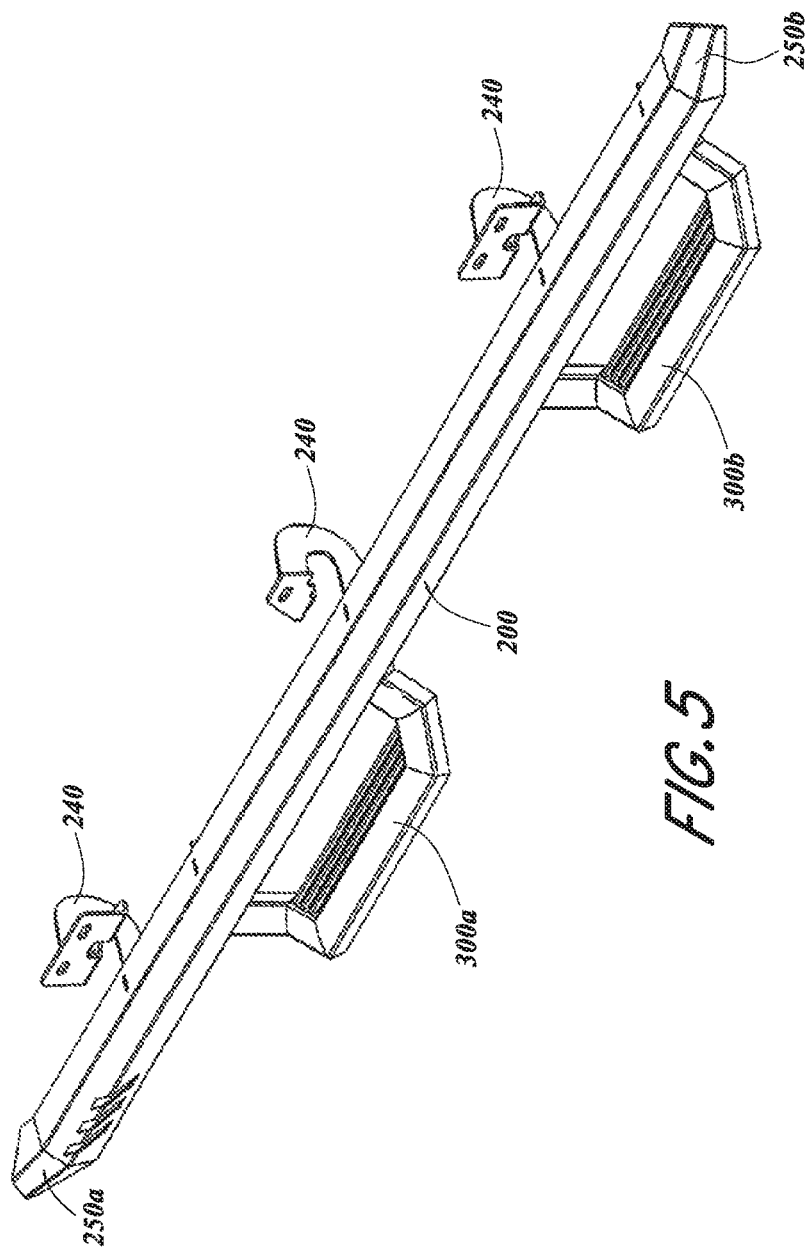
FIG. 5 is a perspective view of the modular side rail and step system in the first step assembly configuration of FIG. 1.
Figure 6:
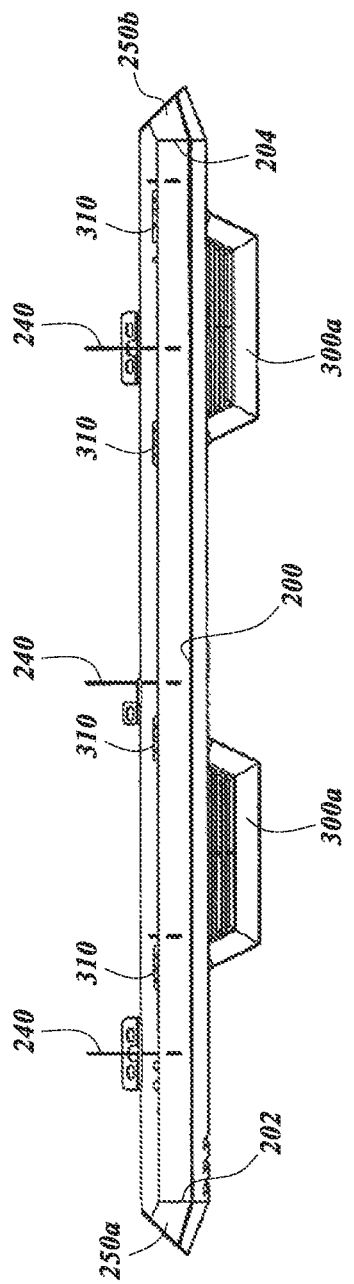
FIG. 6 is a top view of the modular side rail and step system in the first step assembly configuration of FIG. 1.
Figure 7:
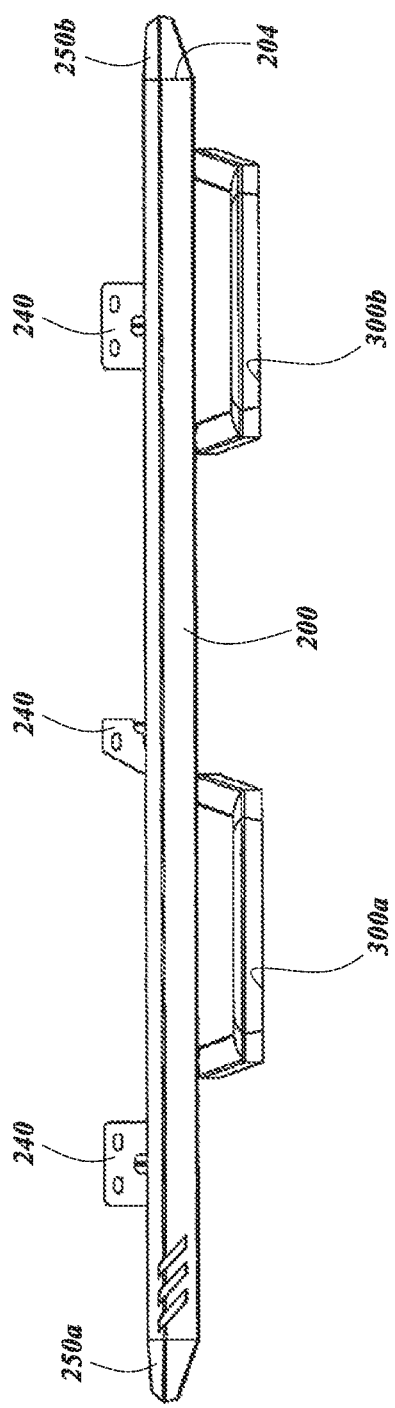
FIG. 7 is a side view of the modular side rail and step system in the first step assembly configuration of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 27:
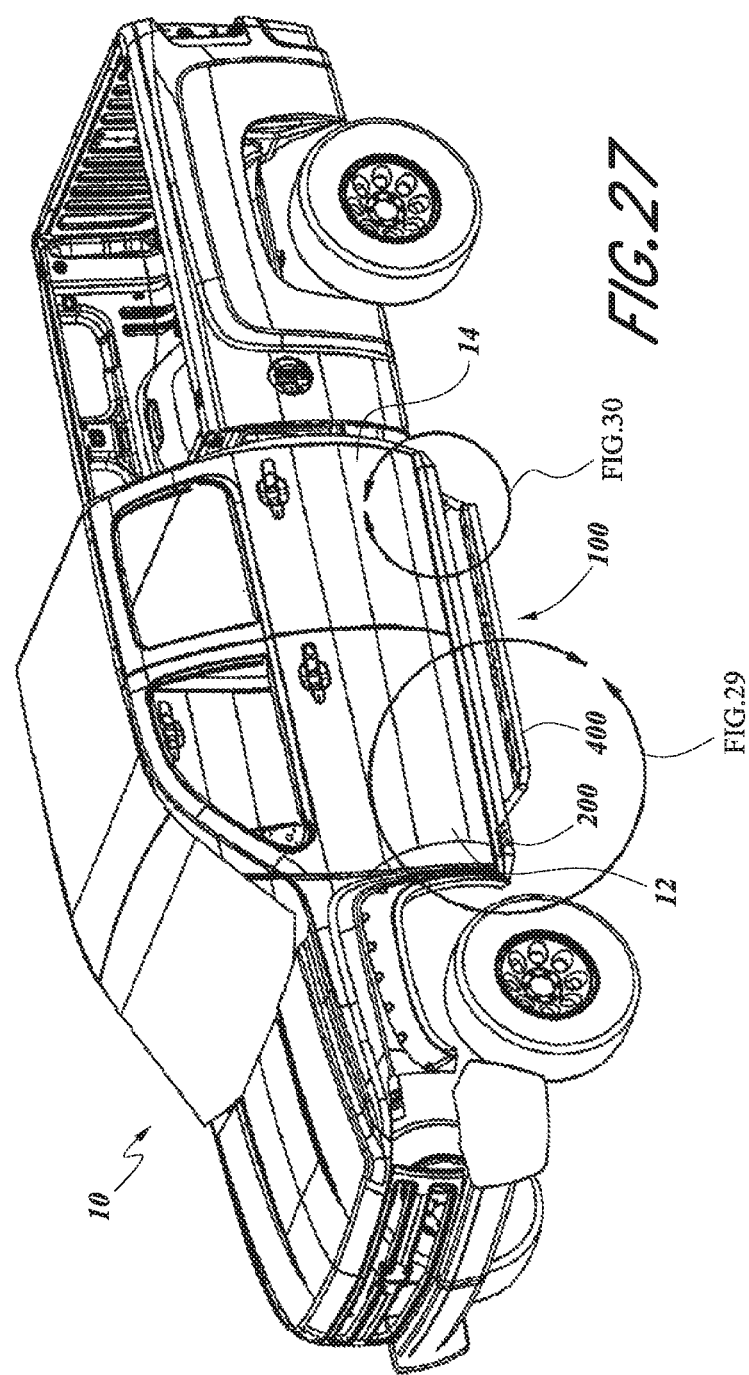
FIG. 27 is a perspective view of the motor vehicle provided with the modular side rail and step system of FIG. 1 in a second step assembly configuration.
Figure 28:
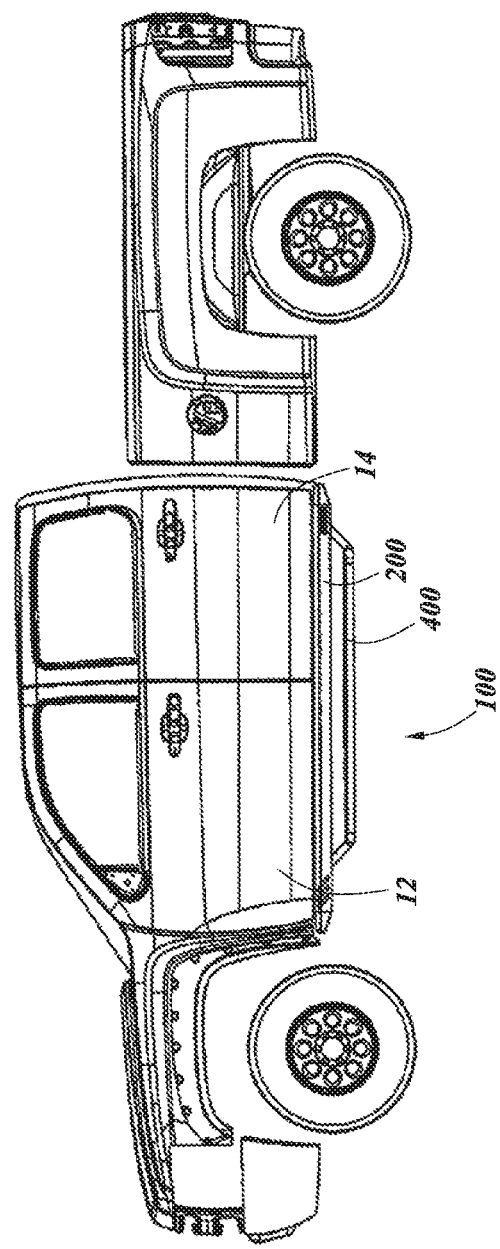
FIG. 28 is a side view of the motor vehicle provided with the modular side rail and step system in the second step assembly configuration of FIG. 27.
Figure 29:
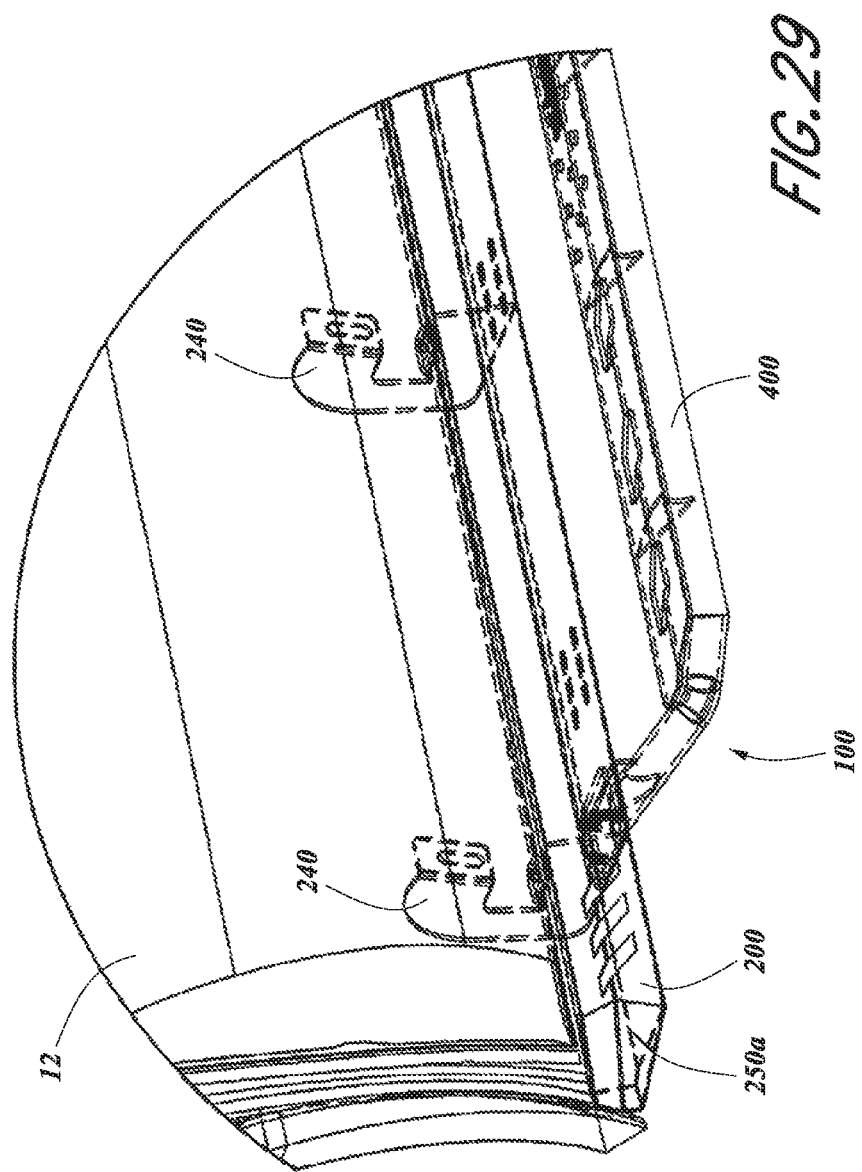
FIG. 29 is an enlarged perspective view of a portion of the vehicle provided with the modular side rail and step system in the first step assembly configuration of FIG. 1, as identified at A3 in FIG. 27.
Figure 30:
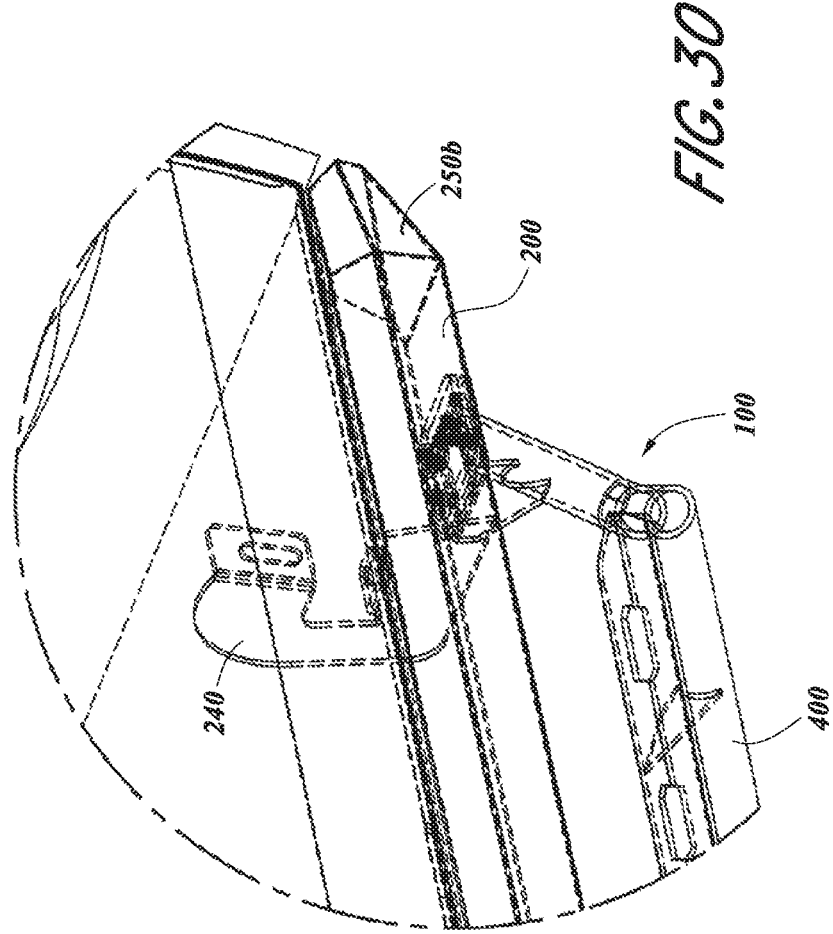
FIG. 30 is an enlarged perspective view of a portion of the vehicle provided with the modular side rail and step system in the second step assembly configuration of FIG. 27, as identified at A4 in FIG. 27.
Figure 31:
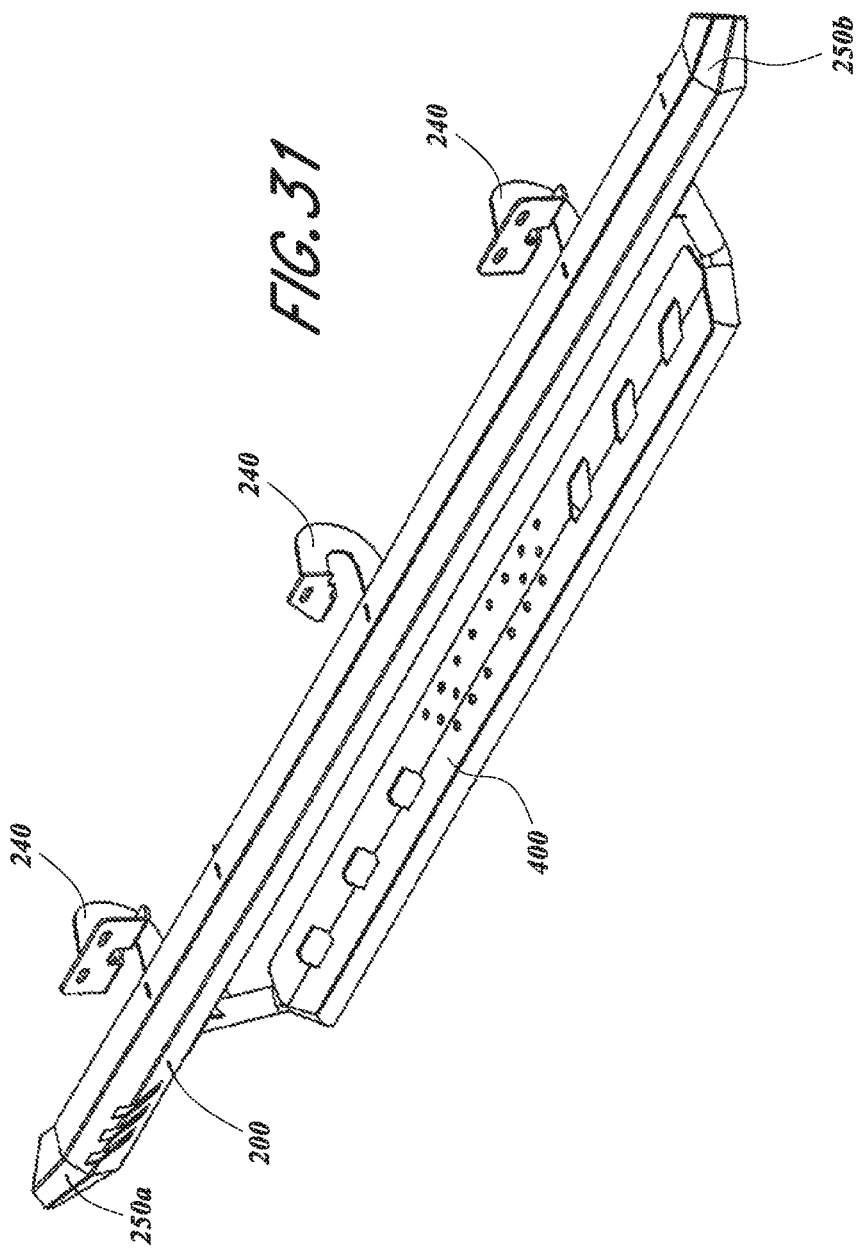
FIG. 31 is a perspective view of the modular side rail and step system in the second step assembly configuration of FIG. 27.
Figure 32:
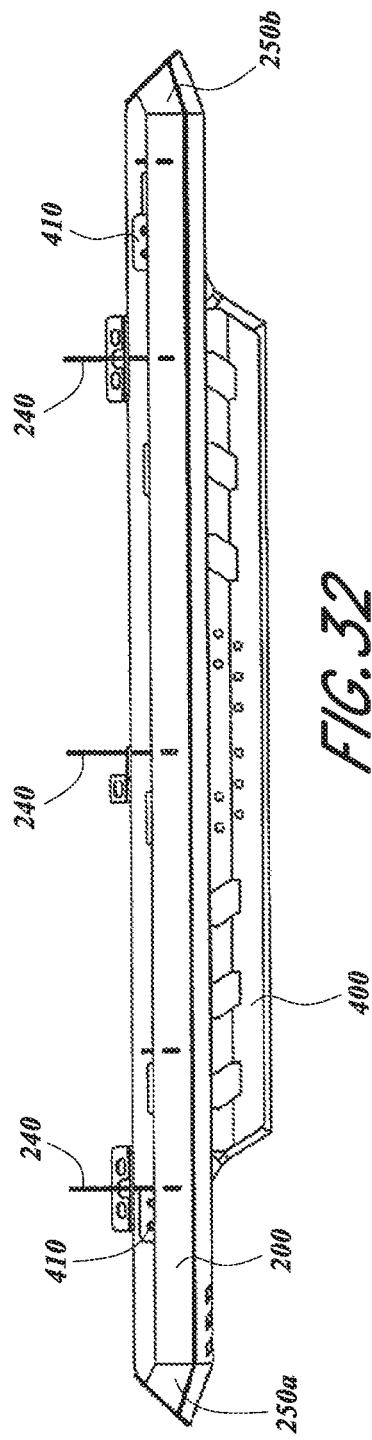
FIG. 32 is a top view of the modular side rail and step system in the second step assembly configuration of FIG. 27.
Figure 33:
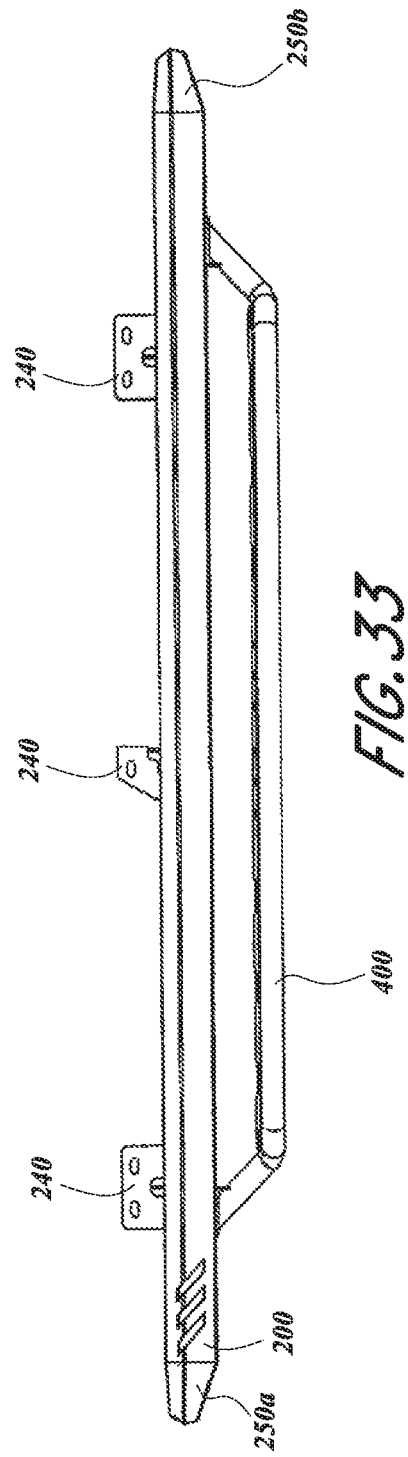
FIG. 33 is a side view of the modular side rail and step system in the second step assembly configuration of FIG. 27.

With reference to the Figures, a modular side rail and removable step system 100 for a vehicle 10. As shown, vehicle 10 is a quad-cab pickup truck. However, the system 100 is usable with many other types of vehicles, for example standard cab pickup trucks, extended cab pickup trucks, and sport utility vehicles such as JEEP® brand vehicles. In one aspect, the modular side rail and removable step system 100 includes a side rail main body 200 configured for mounting to vehicle 10 via mounting brackets 240. In turn, the side rail main body 200 is configured to support one or more removable steps (300, 400) that can be placed in a number of different step assembly configurations. For example, FIG. 1 shows two steps 300a, 300b (collectively referenced as 300) mounted to the side rail main body 200 while FIG. 27 shows an alternative arrangement in which a single, longer step 400 is mounted to the same side rail main body 200. Referring to FIG. 37, a configuration is presented in which no steps are mounted on the side rail main body 200, such as may be desired when additional ground clearance is desired. As, the disclosed modular side rail and removable step system 100 can be provided in a multitude of configurations, a portion or all of the same system 100 may be used on a variety of vehicles. Additionally, the modularity of the system 100 allows a vehicle owner to purchase components of the system separately in order to spread out costs. For example, a vehicle owner may initially purchase only the side rail main body 200 and then later purchase the removable steps 300 or 400. Various aspects of the modular side rail and removable step system 100 are discussed further herein.

The side rail main body 200 may also be provided with one or more apertures or slots 216 for aesthetic purposes and/or to allow for improved mud shedding and easier cleaning. As shown, the side rail main body 200 slots 216 extend across the third and fourth side rail members 212, 214 of the side rail main body 200.

Figure 15:
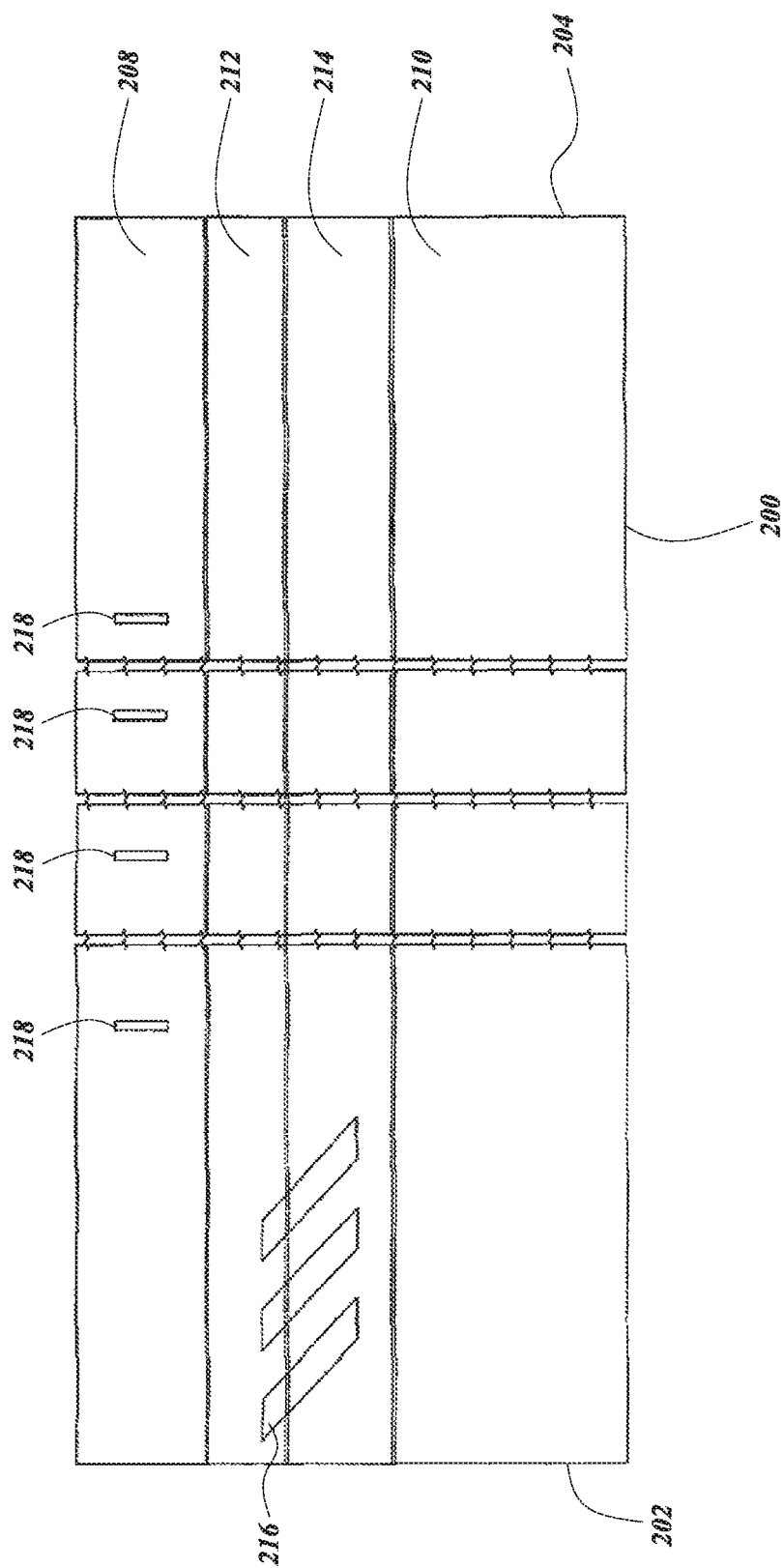
FIG. 15 is a top view of a flat sheet that can be folded to form the modular side rail of FIG. 13.

Referring to FIG. 15, it can be seen that the side rail main body 200 may be formed from an initially flat sheet, for example a flat sheet of about 11 gage steel. Other sheet thicknesses may also be used. The side rail main body 200 may be formed by other processes as well, for example by stamping, casting, or extrusion.

The side rail main body 200 may also be provided with apertures or slots 218 configured to receive a tab portion 242 of the mounting brackets 240. As configured, the tab portion 242 extends through the slot 218 at which point the tab portion 242 can be welded to the side rail main body 200 at the point of the slot 218. Other aspects of the mounting brackets 240 and their connection to the side rail main body 200 are discussed in later paragraphs.

In one aspect, the side rail main body 200 extends between a first end 202 and a second end 204 and is formed to have a channel-shape defining a longitudinal opening 206 extending between the first and second ends 202, 204. As shown, the channel shape of the main body 200 is defined by a first side rail member 208, a second side rail member 210, a third side rail member 212, and a fourth side rail member 214, wherein the first and second side rail members 208, 210 define the longitudinal opening 206. While the side rail main body 200 is shown as having four sides 208, 210, 212, 214, more or fewer sides may be used to form the main body 200, for example two sides, three sides, five sides, and six sides.

In one aspect, the first side rail member 208 of the side rail main body 200 is disposed at an obtuse angle with respect to the adjacent third side rail member 212, the third side rail member 212 is disposed at an obtuse angle with respect to the adjacent fourth side rail member 214, the fourth side rail member 214 is disposed at an obtuse angle with respect to the adjacent second side rail member 210, and the first side rail member 208 is disposed at an acute angle with respect to the opposite second side rail member 210. Additionally, when mounted to the vehicle 10, the second side rail member 210 is generally parallel to the ground. However, it should be understood that other angles may be utilized without departing from the concepts presented herein.

Figure 16:
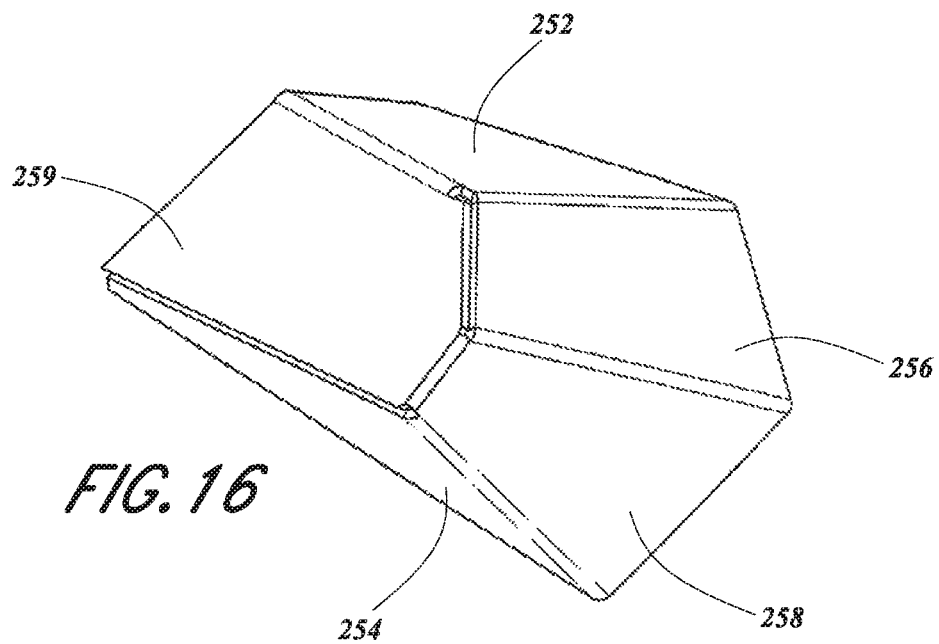
FIG. 16 is a perspective view of an end cap of the modular side rail of FIG. 13.
Figure 17:
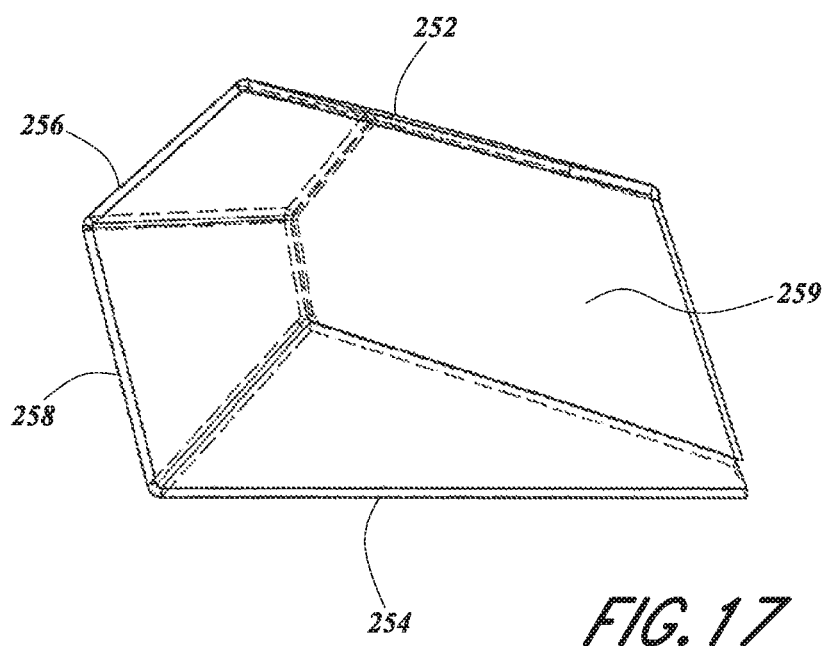
FIG. 17 is an end view of the end cap of FIG. 16.
Figure 18:
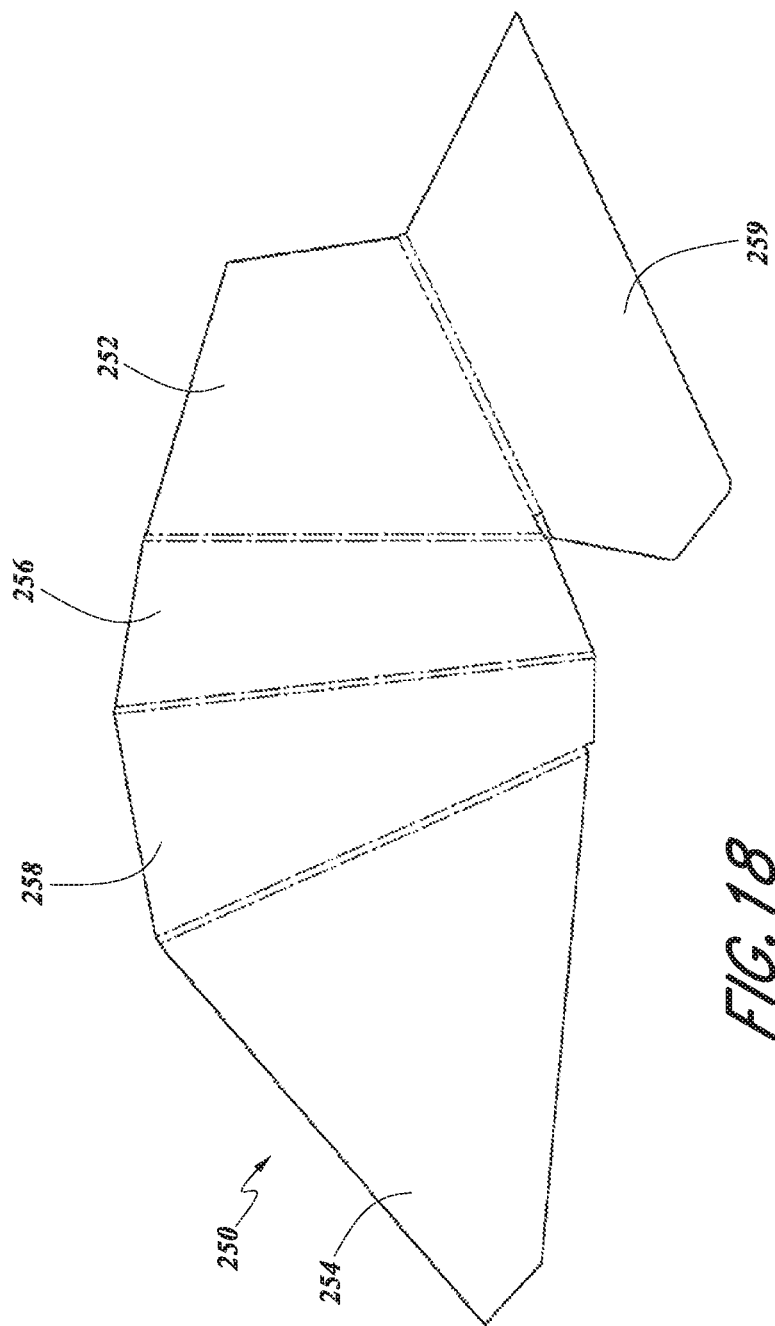
FIG. 18 is a top view of a flat sheet that can be folded to form the end cap of FIG. 16.
Figure 19:
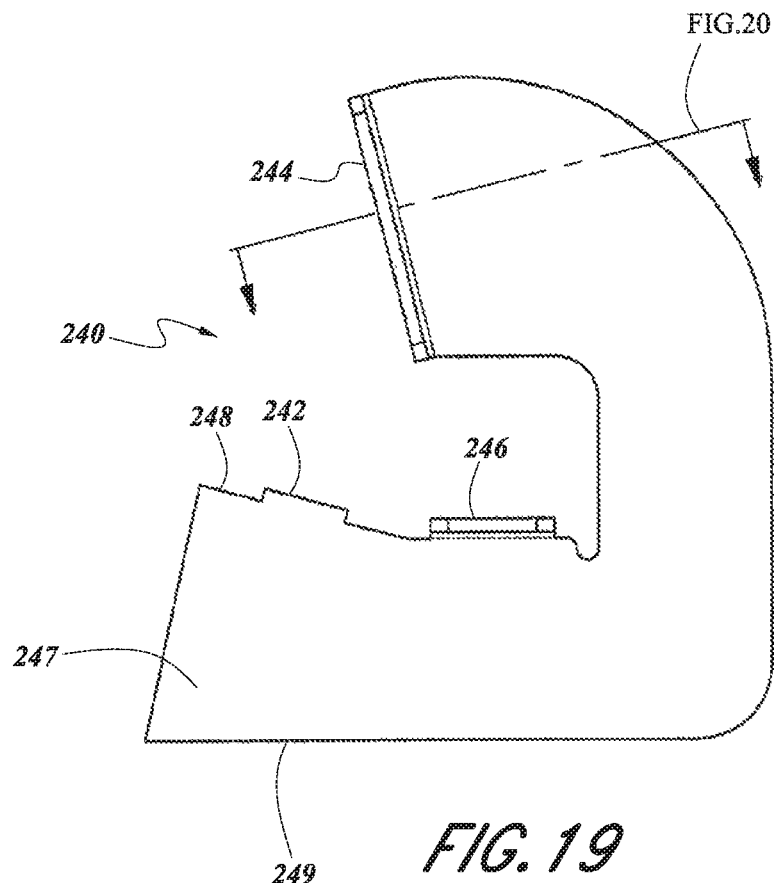
FIG. 19 is a first side view of the bracket of the system shown in FIG. 1.
Figure 20:
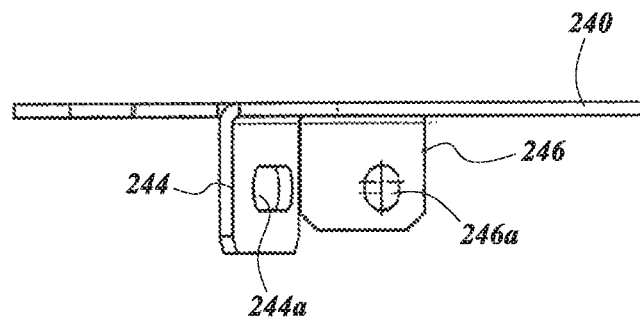
FIG. 20 is a top view of the bracket of the system of FIG. 19.
Figure 21:
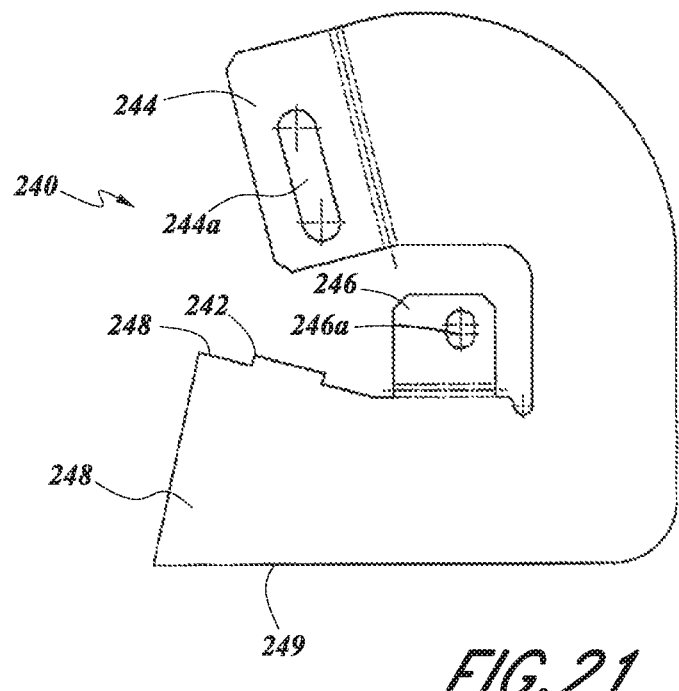
FIG. 21 is a view of a flat sheet that can be folded to form the bracket of the system of FIG. 19.
Figure 22:
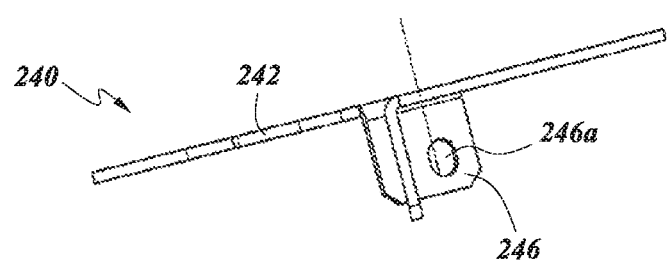
FIG. 22 is a bottom view of the bracket of the system of FIG. 19.

As shown, the side rail main body 200 may be provided with a first end cap 250a connected to the first end 202 of the side rail main body 200 and a second end cap 250b connected to the second end 204 of the side rail main body 200. In one aspect, the end caps 250a, 250b (collectively referred to as 250) are mirror images of each other and are shaped to match the cross-sectional profile of the side rail main body. With reference to FIGS. 16-18, each end cap 250 is provided with a first side 252, a second side 254, a third side 256, and a fourth side 258 that correspond to the first through fourth side rail members 208, 210, 212, 214 of the side rail main body 200. Each end cap 250 is additionally provided with a fifth side 259 extending between the first through fourth sides 252, 254, 256, 258 to form a closed structure once the end caps 250a, 250b are attached to the side rail main body 200. In the embodiment shown, the end caps 250 are welded to the side rail main body 200. However, other connections means are certainly possible, such as the use of fasteners. Referring to FIG. 18, it can be seen that the end cap 250 may be formed from an initially flat sheet, for example a flat sheet of 11 gage steel. Other sheet thicknesses may also be used.

Figure 8:
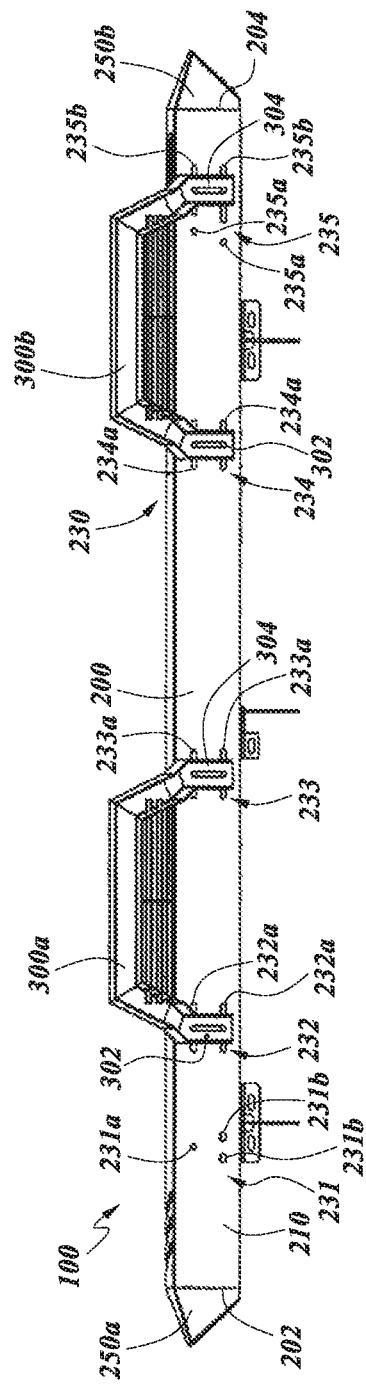
FIG. 8 is a bottom view of the modular side rail and step system in the first step assembly configuration of FIG. 1.

As most easily seen at FIG. 8, the second side rail member 210 of the side rail main body 200 is provided with a plurality of step attachment arrangements 230, for example a first step attachment arrangement 231, a second step attachment arrangement 232, a third step attachment arrangement 233, a fourth step attachment arrangement 234, and a fifth step attachment arrangement 235 (collectively and/or generically referred to as step attachment arrangements 230). The step attachment arrangements 230 are arranged and configured to provide attachment locations for enabling removable steps to be mounted in various assembly configurations. In the exemplary embodiment shown, the plurality of attachment arrangements 230 enable the first and second removable steps 300, 400 to be mounted in the first and second step assembly configurations shown in FIGS. 1 and 27, respectively.

Notably, the locations of the step attachment arrangements 230 are offset from the locations of the slots 218, and thus offset from the mounting brackets 240. This arrangement allows for the side bar main body 200 to be mounted to the vehicle 10 while still allowing for the steps 300, 400 to be mounted in a desired position with respect to the vehicle 10. For example, the mounting locations of the step attachment arrangements 230 allow the steps 300, 400 to be positioned and centered below the doors 12, 14 of the vehicle.

As shown, the step attachment arrangements 230 include a number of differently configured mounting apertures that function as through holes for fasteners (not shown) for securing the steps 300, 400 to the side rail main body 200 in the various step assembly configurations. For example, the first step attachment arrangement 231 is provided with a mounting aperture 231a presented as a circular hole and two mounting apertures 231b presented as short slots. The second, third, and fourth step attachment arrangements 232, 233, 234 are shown as being provided as a pair of mounting apertures 232a, 233a, 234a, respectively, in the form of parallel longitudinally extending slots. The fifth step arrangement 235 is shown as including mounting apertures 235a, 235b presented as circular holes and parallel longitudinally extending slots, respectively. Other numbers and shapes of mounting apertures may be utilized for the step attachment arrangements without departing from the concepts presented herein.

In one aspect, the second and third step attachment arrangements 232, 233 are configured to provide attachment locations for the removable step 300a while the fourth and fifth step attachment arrangements 234, 235 provide attachment locations for the removable step 300b in a first step assembly configuration. In another aspect, the first and fifth step attachment arrangements 231, 235 are configured to provide attachment locations for the removable step 400 in a second step assembly configuration. Many other configurations between steps and/or attachment arrangements to result in additional step assembly configurations are possible without departing from the concepts presented herein.

As identified previously, the side rail main body 200 may be mounted to the vehicle 10 by a plurality of spaced mounting brackets 240. The brackets 240 are shown in greater detail at FIGS. 12 and 19-22. As shown, each mounting bracket 240 includes a first and second mounting arrangement 244, 246 including mounting apertures 244a, 246a, respectively. The mounting arrangements 244, 246 are configured to mate with portions of the vehicle body (not shown) and secure the bracket 240 in both a vertical direction and a horizontal direction with respect to the ground. The mounting apertures 244a, 246a are configured to receive fasteners (not shown) that mount to the vehicle 10 to secure the bracket 240 to the vehicle 10. It is noted that the configuration of the first and second mounting arrangements 244, 246 can be adjusted to match the mounting requirements of a particular vehicle.

Each mounting bracket 240 is further provided with an extension portion 247 having a first side 248 and a second side 249. The previously discussed tab portion 242 extends along the first side 248. In one aspect, the extension portion 247 extends through the longitudinal opening 206 of the side bar main body 200 such that the bracket first side 248 is adjacent to the side bar main body first side rail member 208 and such that the tab portion 242 extends through the slot 218 of the main body 200. Additionally, the bracket second side 249 is adjacent to the side bar main body second side rail member 210. Once assembled, the bracket 240 can be secured to the main body 200 by welding or other means along the first side 248, the second side 249, and/or the tab portion 242 of the bracket 240. Accordingly, the brackets 240 are an integral structural component of the side rail assembly such that the brackets 240 and the side bar main body 200 together form a unitary structure. It is noted that the addition of the brackets 240 to the side bar main body 200 significantly increases the stiffness of the main body 200. Because the second side 249 of each bracket 240 is adjacent to and secured to the side bar main body second side rail member 210, the stiffness at the second side rail member 210 is sufficient to allow the side bar main body 200 to function as a true rock rail to protect the vehicle 10 from impacts from below. This construction also allows for sufficient stiffness to support the weight of a person standing on the step during vehicle entry and exiting. The brackets 240 could also be secured to the main body 200 by means other than welding, for example with fasteners such as rivets or bolts.

Referring to FIGS. 23-26, the removable step 300 is shown in further detail. In one aspect, the removable step 300 has a length L1 defined by a first arm 302 and a second arm 304 between which a step portion 306 is presented. As configured, the first arm 302 is provided with a mounting aperture 302a while the second arm 304 is provided with a mounting aperture 304a. The mounting apertures 302a, 302b are presented as extending slots and are configured to align with the step arrangements 230 of the side bar main body 200. In the embodiment shown, the mounting aperture slots 302a, 302b extend in a direction that is orthogonal to the direction of the slots associated with the second, third, fourth and fifth attachment arrangements 232, 233, 234, 235 which allows for the step to be adjusted in two directions: a direction parallel to the length of the side bar main body 200 and a direction orthogonal to the length of the side bar main body 200.

Figure 8A:
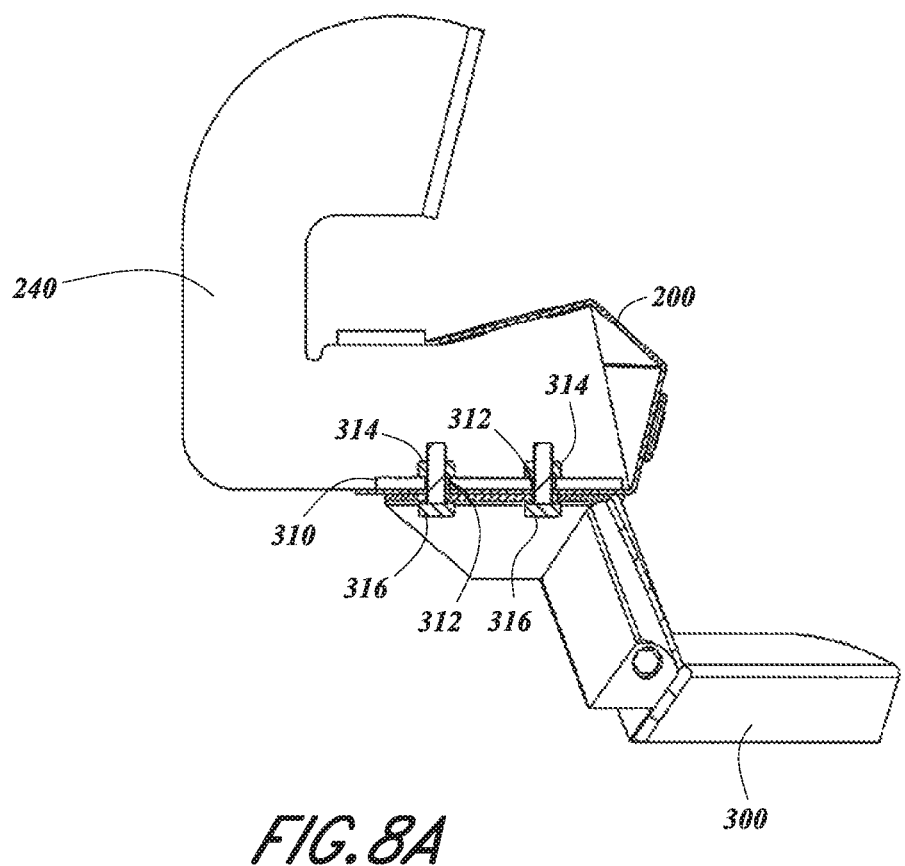
FIG. 8A is a cross-sectional view of the modular side rail and step system in the first step assembly configuration of FIG. 1, taken at a location where a step attaches to the side rail.
Figure 9:
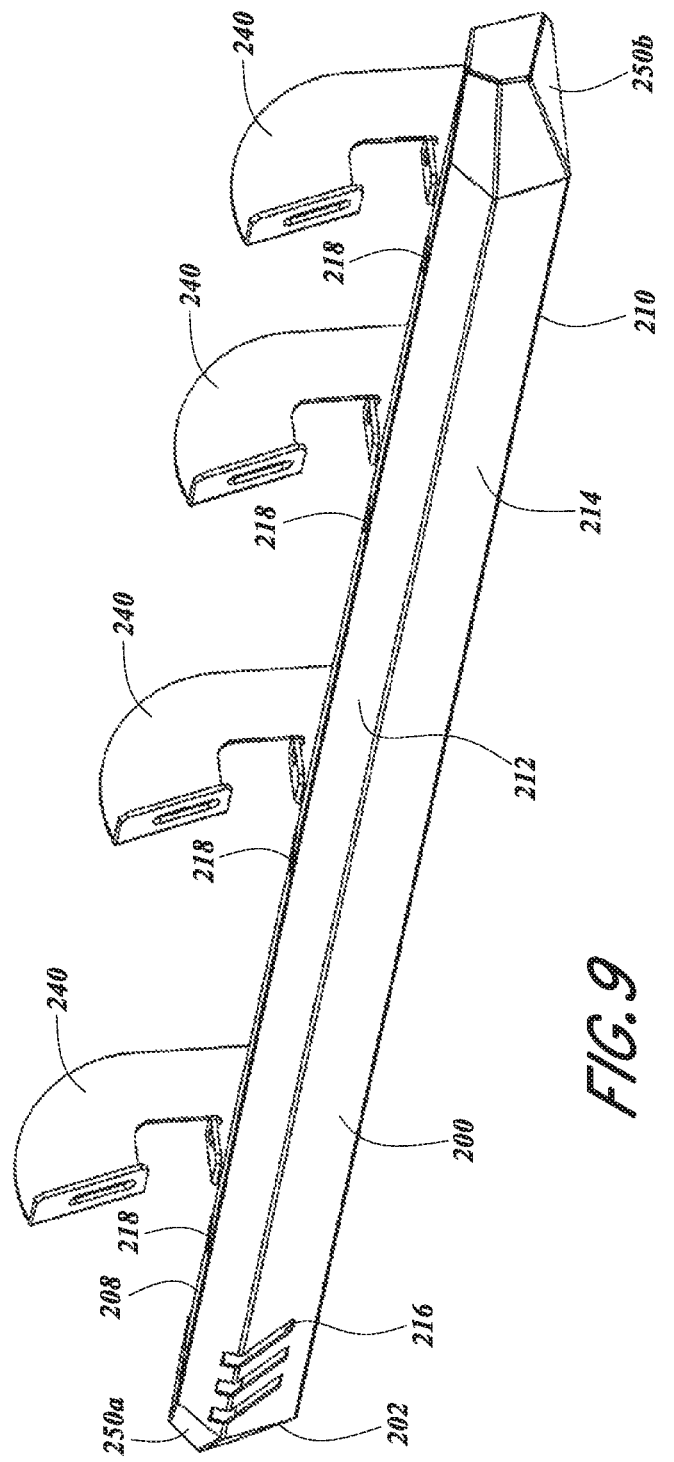
FIG. 9 is a perspective view of the modular side rail and brackets of the system shown in FIG. 1.
Figure 9A:
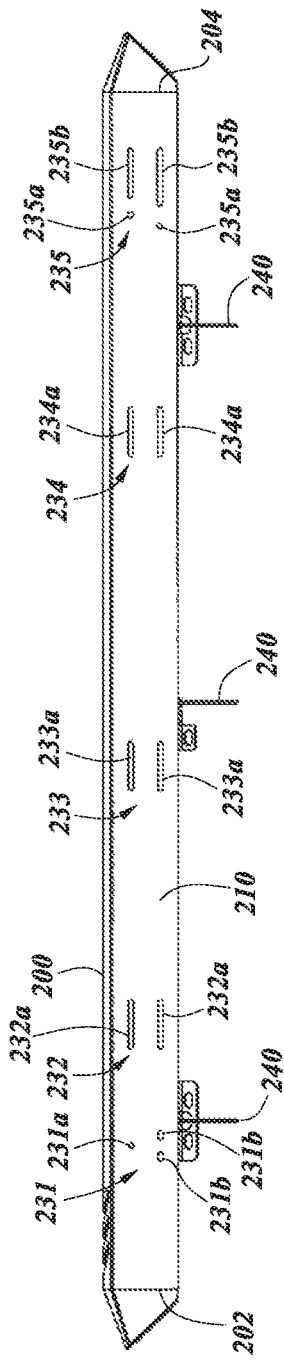
FIG. 9A is a bottom view of the modular side rail and brackets of FIG. 9.
Figure 10:
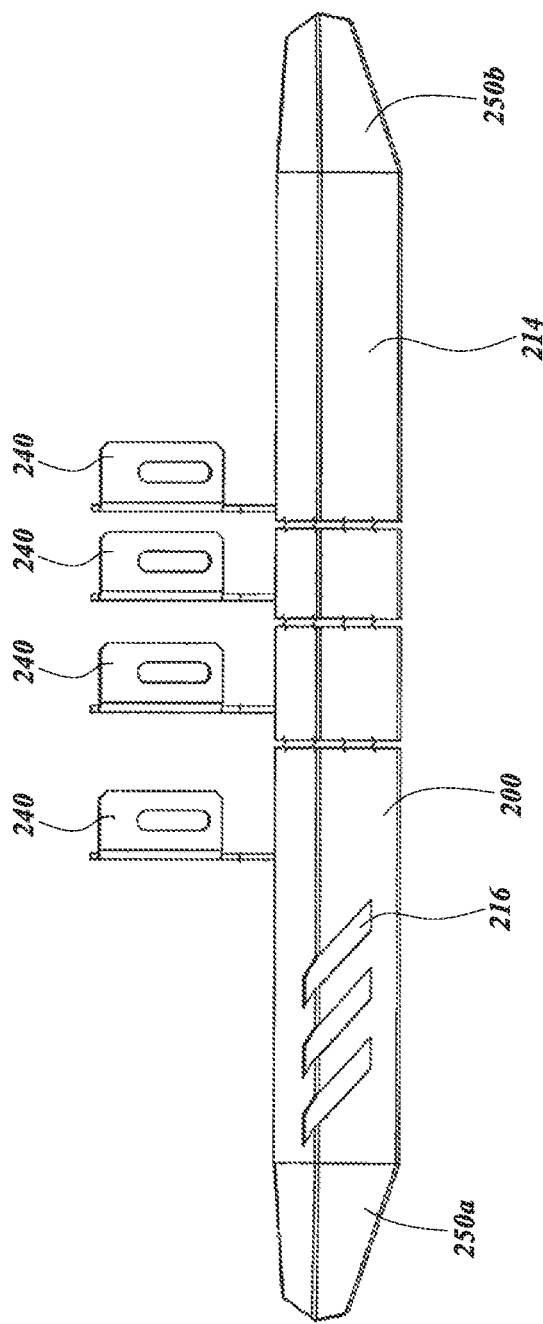
FIG. 10 is a side view of the modular side rail and brackets of FIG. 9.

As mentioned previously, the removable step 300 can be removably mounted to the side bar main body 200 via removable fasteners 316, such as bolts. A pinch plate 310 may also be utilized to clamp the second side rail member 210 of the side bar main body 200 on the opposite side of the first and second arms 302, 304 to strengthen the connection between the step 300 and the main body 200, as shown at FIG. 8A. In the embodiment shown, the pinch plate 310 includes apertures 312 that can be aligned with the mounting apertures of the step attachment arrangements such that the fasteners 316 may pass through both the side rail main body 200 and the pinch plate 310. In one aspect, the pinch plate 310 includes a threaded member 314 at each aperture 312, shown herein as a threaded nut welded to the pinch plate, for engaging the fasteners 316.

Figure 25A:
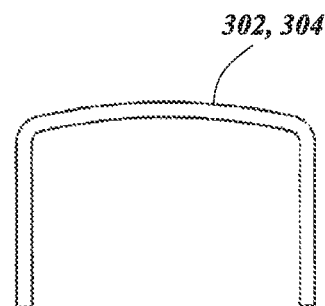
FIG. 25a is a side view of an arm of the step assembly shown in FIG. 23.
Figure 26:
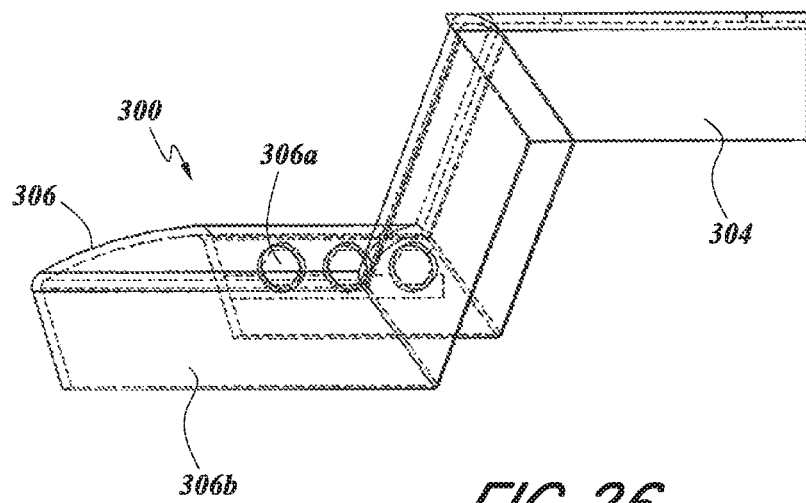
FIG. 26 is an end view of the step assembly of the system shown in FIG. 23.

To further strengthen the step 300, the first and second arms 302, 304 can be provided with a channel-shape, as most easily seen at FIG. 25a. To improve mud shedding and/or aesthetics of the step 300, the step portion 306 may be formed with individually spaced bars 306a extending between a support portion 306b.

Referring to FIGS. 34-35, the removable step 400 is shown in further detail. In one aspect, the removable step 400 has a length L2 defined by a first mounting plate 402 and a second mounting plate 404. A support bar 405 is also provided with step 400 that extends between the mounting plates 402, 404 and also serves to support a step portion 406. As presented, the length L1 of the removable step 300 is less than the length L2 of the removable step 400. As configured, the first arm 402 is provided with mounting apertures 402a while the second arm 404 is provided with mounting apertures 404a. The mounting apertures 402a, 402b are presented as parallel extending slots and are configured to align with the step arrangements 230 of the side bar main body 200. In the embodiment shown, the mounting aperture slots 402a, 402b extend in a direction that is orthogonal to the direction of the slots associated with the first and fifth attachment arrangements 231, 235 which allows for the step to be adjusted in two directions: a direction parallel to the length of the side bar main body 200 and a direction orthogonal to the length of the side bar main body 200. However, adjustment in the direction parallel to the length of the side mar main body 200 of the step 400 is limited where mounting apertures 231a and/or 235a are utilized, as is shown in the drawings.

As mentioned previously, the removable step 400 can be removably mounted to the side bar main body 200 via removable fasteners 416, such as bolts. A pinch plate 410 may also be utilized to clamp the second side rail member 210 of the side bar main body 200 on the opposite side of the first and second mounting plates 402, 404 to strengthen the connection between the step 400 and the main body 200, as shown at FIG. 36A. In the embodiment shown, the pinch plate 410 includes apertures 412 that can be aligned with the mounting apertures of the step attachment arrangements such that the fasteners 416 may pass through both the side rail main body 200 and the pinch plate 410. In one aspect, the pinch plate 410 includes a threaded member 414 at each aperture 412, shown herein as a threaded nut welded to the pinch plate, for engaging the fasteners 416.

To improve mud shedding and/or aesthetics of the step 400, the step portion 406 may be formed with various openings 406a, 406b. As shown, the step portion 406 is welded to the support arm 405. To further strengthen the step 400, the first and second mounting plates 402, 404 can be provided with a channel-shape, as most easily seen at FIG. 35. To improve mud shedding and/or aesthetics of the step 300, the step portion 306 may be formed with individually spaced bars 306a extending between a support portion 306b.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A modular rail and step system for a vehicle, the system comprising:
   a side rail main body extending from a forward end to a rearward end and having a top surface, a bottom surface, and an outer surface, the side rail main body configured to extend at least partially along a length of the vehicle;
   a plurality of mounting brackets configured for mounting the side rail main body to the vehicle in a position beneath one or more doors of the vehicle; and
   a removable step comprising:
     a forward mounting portion configured to be removably coupled to the bottom surface of the side rail main body;
     a rearward mounting portion configured to be removably coupled to the bottom surface of the side rail main body;
     a support portion extending from the forward mounting portion to the rearward mounting portion, the support portion comprising a forward portion that extends downward and rearward from the forward mounting portion and a rearward portion that extends downward and forward from the rearward mounting portion; and
     a step portion attached to the support portion, the step portion positioned to be spaced apart from the side rail main body and extend parallel to the length of the vehicle when the forward mounting portion and the rearward mounting portion are coupled to the bottom surface of the side rail main body.

2. The modular rail and step system of claim 1, wherein the support portion of the removable step comprises a round bar extending from the forward mounting portion to the rearward mounting portion.

3. The modular rail and step system of claim 1, wherein the forward mounting portion and the rearward mounting portion each comprise a channel shape.

4. The modular rail and step system of claim 1, wherein the forward portion of the support portion further extends outward from the forward mounting portion, and the rearward portion of the support portion further extends outward from the rearward mounting portion.

5. The modular rail and step system of claim 1, wherein the step portion comprises a stepping surface having a plurality of openings passing therethrough.

6. The modular rail and step system of claim 1, wherein the step portion is attached to a top surface of the support portion.

7. The modular rail and step system of claim 1, wherein the forward mounting portion and the rearward mounting portion each comprise a mounting slot for coupling the removable step to the bottom surface of the side rail main body, the mounting slot extending along a first direction.

8. The modular rail and step system of claim 7, wherein the bottom surface of the side rail main body comprises a plurality of mounting slots configured to couple to the mounting slots of the removable step using fasteners, the plurality of mounting slots of the side rail extending along a second direction.

9. The modular rail and step system of claim 8, wherein the first direction is perpendicular to the second direction.

10. The modular rail and step system of claim 1, wherein the forward mounting portion and the rearward mounting portion each comprise a plurality of mounting slots for coupling the removable step to the bottom surface of the side rail main body.

11. The modular rail and step system of claim 1, wherein a length of the removable step is at least two-thirds a length of the side rail main body.

12. The modular rail and step system of claim 1, further comprising a second removable step configured to be removably coupled to the bottom surface of the side rail main body.

13. A vehicle comprising:
a first modular rail and step system attached to a first side of the vehicle, the system comprising:
  a side rail main body extending from a forward end to a rearward end and having a top surface, a bottom surface, and an outer surface, the side rail main body extending at least partially along a length of the vehicle;
  a plurality of mounting brackets that mount the side rail main body to the first side of the vehicle in a position beneath one or more doors of the vehicle; and
  a removable step comprising:
    a forward mounting portion removably coupled to the bottom surface of the side rail main body;
    a rearward mounting portion removably coupled to the bottom surface of the side rail main body;
    a support portion extending from the forward mounting portion to the rearward mounting portion, the support portion comprising a forward portion that extends downward and rearward from the forward mounting portion and a rearward portion that extends downward and forward from the rearward mounting portion; and
    a step portion attached to the support portion, the step portion spaced apart from the side rail main body and extending parallel to the length of the vehicle.

14. The vehicle of claim 13, further comprising a second modular rail and step system attached to a second side of the vehicle.

15. The vehicle of claim 13, wherein the support portion of the removable step comprises a round bar extending from the forward mounting portion to the rearward mounting portion.

16. The vehicle of claim 13, wherein the forward mounting portion and the rearward mounting portion each comprise a channel shape.

17. The vehicle of claim 13, wherein the forward portion of the support portion further extends outward from the forward mounting portion, and the rearward portion of the support portion further extends outward from the rearward mounting portion.

18. The vehicle of claim 13, wherein the step portion comprises a stepping surface having a plurality of openings passing therethrough.

19. The vehicle of claim 13, wherein the forward mounting portion and the rearward mounting portion each comprise a mounting slot extending along a first direction, the bottom surface of the side rail main body comprises a plurality of mounting slots extending along a second direction, and the first direction is perpendicular to the second direction.

20. The vehicle of claim 13, wherein a length of the removable step is at least two-thirds a length of the side rail main body.

* * * * *